United States Patent
Pursifull et al.

(10) Patent No.: US 10,280,875 B2
(45) Date of Patent: May 7, 2019

(54) METHODS AND SYSTEM FOR CONTROLLING ENGINE AIRFLOW WITH AN AUXILIARY THROTTLE ARRANGED IN SERIES WITH A VENTURI AND IN PARALLEL WITH A MAIN INTAKE THROTTLE

(71) Applicant: Ford Global Technologies, LLC, Dearborn, MI (US)

(72) Inventors: Ross Dykstra Pursifull, Dearborn, MI (US); Brent Alan Hall, Grand Blanc, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/666,188

(22) Filed: Aug. 1, 2017

(65) Prior Publication Data

US 2019/0040823 A1     Feb. 7, 2019

(51) Int. Cl.
  *F02D 31/00*    (2006.01)
  *F02D 41/00*    (2006.01)
  *F02D 41/08*    (2006.01)
  *F02M 25/08*    (2006.01)

(52) U.S. Cl.
  CPC ....... *F02M 25/0836* (2013.01); *F02D 31/005* (2013.01); *F02D 41/004* (2013.01); *F02D 41/0032* (2013.01); *F02D 41/08* (2013.01); *F02D 2200/0406* (2013.01)

(58) Field of Classification Search
  CPC ... F02M 25/0836; F02D 41/004; F02D 41/08; F02D 41/0032; F02D 31/005; F02D 2200/0406

USPC .................. 123/520, 519, 518, 516
See application file for complete search history.

(56) References Cited

U.S. PATENT DOCUMENTS

| 4,796,579 A | 1/1989 | Wolfe et al. |
| 5,069,188 A | 12/1991 | Cook |
| 5,215,055 A | 6/1993 | Orzel |
| 6,305,360 B1 | 10/2001 | Hurley |
| 8,726,891 B2 | 5/2014 | Pursifull et al. |

(Continued)

OTHER PUBLICATIONS

Pursifull, R., "Unconventional Approach to Achieving a Default Throttle Position," Proceedings of the 2000 SAE World Congress, Mar. 6, 2000, Detroit, Michigan, 5 pages.

(Continued)

*Primary Examiner* — Mahmoud Gimie
(74) *Attorney, Agent, or Firm* — Julia Voutyras; McCoy Russell LLP

(57) ABSTRACT

Methods and systems are provided for progressively opening and controlling each of a fuel vapor canister purge valve (CPV), an auxiliary throttle coupled in series with a venturi, and a main intake throttle arranged in parallel with the auxiliary throttle in order to deliver a desired intake airflow or manifold vacuum to an engine intake manifold. In one example, a method may include actuating a CPV to supply airflow to the engine via a fuel vapor canister while holding closed a main throttle and an auxiliary throttle arranged in parallel with the main throttle and in series with a venturi. The method further includes progressively opening the CPV, then the auxiliary throttle, and then the main throttle to achieve a desired intake manifold pressure.

19 Claims, 6 Drawing Sheets

(56) References Cited

U.S. PATENT DOCUMENTS

| | | | | |
|---|---|---|---|---|
| 8,783,231 B2* | 7/2014 | Leone | ............... | F02M 25/08 |
| | | | | 123/336 |
| 9,404,453 B2 | 8/2016 | Pursifull | | |
| 9,441,557 B2 | 9/2016 | Pursifull | | |
| 2011/0146631 A1* | 6/2011 | Konohara | .......... | F02M 25/0872 |
| | | | | 123/520 |
| 2014/0299110 A1* | 10/2014 | Heller | ............... | F02M 25/0809 |
| | | | | 123/520 |
| 2015/0275826 A1* | 10/2015 | Balsdon | ............ | F02M 25/0872 |
| | | | | 123/518 |
| 2016/0153472 A1* | 6/2016 | Fletcher | ............... | B60T 17/02 |
| | | | | 123/519 |

OTHER PUBLICATIONS

Pursifull, R. et al., "Throttle Flow Characterization," Proceedings of the 2000 SAE World Congress, Mar. 6, 2000, Detroit, Michigan, 12 pages.

Pursifull, R., "Methods and System for a Common Aspirator Valve," U.S. Appl. No. 15/674,652, filed Aug. 11, 2017, 64 pages.

* cited by examiner

METHODS AND SYSTEM FOR CONTROLLING ENGINE AIRFLOW WITH AN AUXILIARY THROTTLE ARRANGED IN SERIES WITH A VENTURI AND IN PARALLEL WITH A MAIN INTAKE THROTTLE

FIELD

The present description relates generally to methods and systems for controlling purge flow from a fuel vapor canister and airflow to an intake manifold of an engine via coordinated control of a main intake throttle, a canister purge valve, and an auxiliary throttle arranged in series with a venturi and in parallel with the main intake throttle.

BACKGROUND/SUMMARY

Vehicles may be fitted with evaporative emission control systems such as onboard fuel vapor recovery systems. Such systems capture and prevent release of vaporized hydrocarbons to the atmosphere, for example fuel vapors generated in a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. The fuel vapor recovery system may include one more check valves, ejectors (or venturis), and/or controller actuatable valves for facilitating purge of stored vapors under boosted or non-boosted engine operation.

However, in some vehicles, including those that employ start/stop engines, conditions for purging the fuel vapor canister may be limited. In a first mode, when the fuel vapor canister effluent is rich, the purge flow is restricted via adjusting an opening of a canister purge valve to limit the fuel mass provided to the intake manifold of the engine by the fuel vapor canister. In a second mode, when the fuel vapor canister effluent is lean, flow through the canister and to the intake manifold may be restricted less (e.g., by opening the canister purge valve). However, the maximum total flow rate of air flowing through the fuel vapor canister and to the intake manifold may be limited due to reduced intake manifold vacuum during certain engine operating conditions, such as engine idle conditions.

One example approach for purging a fuel vapor canister during idle is shown by Orzel et al. in U.S. Pat. No. 5,215,055. Therein, a bypass throttle positioned in parallel with a main throttle is controlled based on a difference between an actual idle speed and desired idle speed. During purging of the fuel vapor canister, purge flow is reduced when the position of the bypass throttle is less than a preselected fraction of a maximum bypass throttle position.

However, the inventors herein have recognized potential issues with such systems. As one example, controlling purge flow from the canister and to the engine based on engine idle speed and a position of a bypass throttle may reduce the duration and opportunities for purging the fuel vapor canister. Additionally, decreasing an opening of a canister purge valve and/or bypass throttle in this way, based on engine idle speed, may result in lower intake manifold vacuum and decreased purging from the fuel vapor canister. As a result, vapors within the fuel vapor canister may build up over time and purging of the fuel vapor canister may be less efficient.

In one example, the issues described above may be addressed by a method for an engine, including: actuating a canister purge valve (CPV) to supply airflow to the engine via a fuel vapor canister while holding closed a main throttle and an auxiliary throttle arranged in parallel with the main throttle and in series with a venturi; and, as a desired intake manifold pressure increases, progressively opening the CPV, then the auxiliary throttle, and then the main throttle to achieve the desired intake manifold pressure. For example, the opening of the CPV may first be increased while holding the main throttle and auxiliary throttle closed to achieve the desired intake manifold pressure. If the desired intake manifold pressure cannot be obtained by fully opening the CPV alone, then the opening of the auxiliary throttle may be increased while holding the main throttle closed to achieve the desired intake manifold pressure. Similarly, if the desired intake manifold pressure cannot be obtained by fully opening the auxiliary throttle and the CPV, then the opening of the main throttle may be increased and modulated to deliver to the desired intake manifold pressure. In some embodiments, the desired intake manifold pressure may be a desired intake manifold vacuum during an engine idle condition. By holding the main throttle closed as long as possible during engine idle, jittering of the main throttle may be reduced, thereby reducing wear on the throttle position sensor. Additionally, by progressively opening the CPV, then the auxiliary throttle, and then the main throttle, air is first provided by the fuel vapor canister before being provided through the main intake air path. This may increase the frequency and amount of air being drawn through the fuel vapor canister, thereby purging the fuel vapor canister more frequently and maintain the effluent in the canister at a leaner state. By arranging a venturi in series with the auxiliary throttle and then opening the auxiliary throttle, fuel vapor purge vacuum may be increased, thereby allowing air to be continued to be drawn through the canister (whereas without this auxiliary throttle there may not be enough vacuum to continue drawing air through the canister). This progressive opening of the valves may also be performed during non-idle conditions, based on power demand from the engine, in order to deliver a desired air mass flow rate to the engine cylinders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
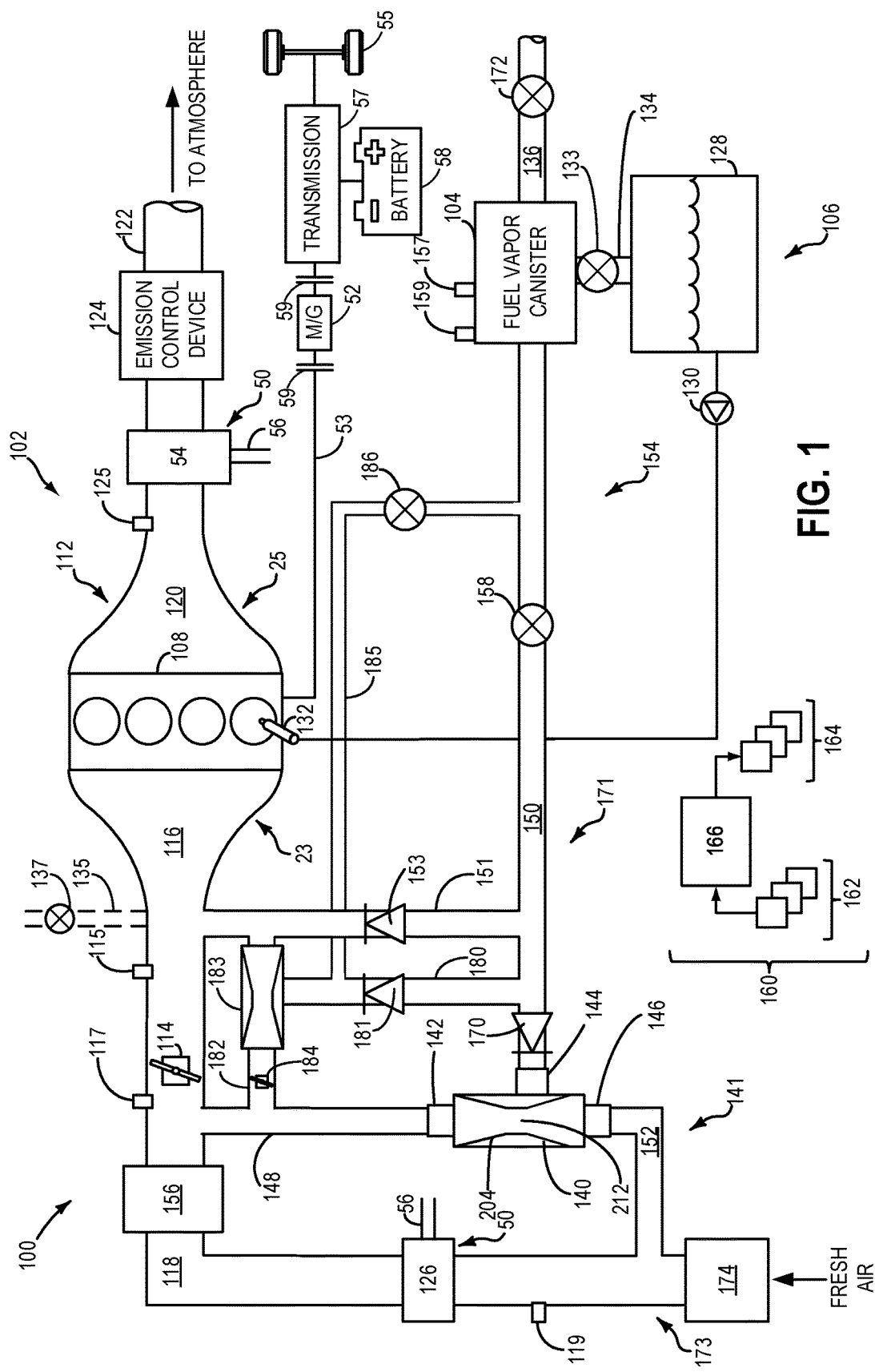
FIG. 1 shows a schematic diagram of a multi-path fuel vapor recovery system of a vehicle system.
Figure 5:
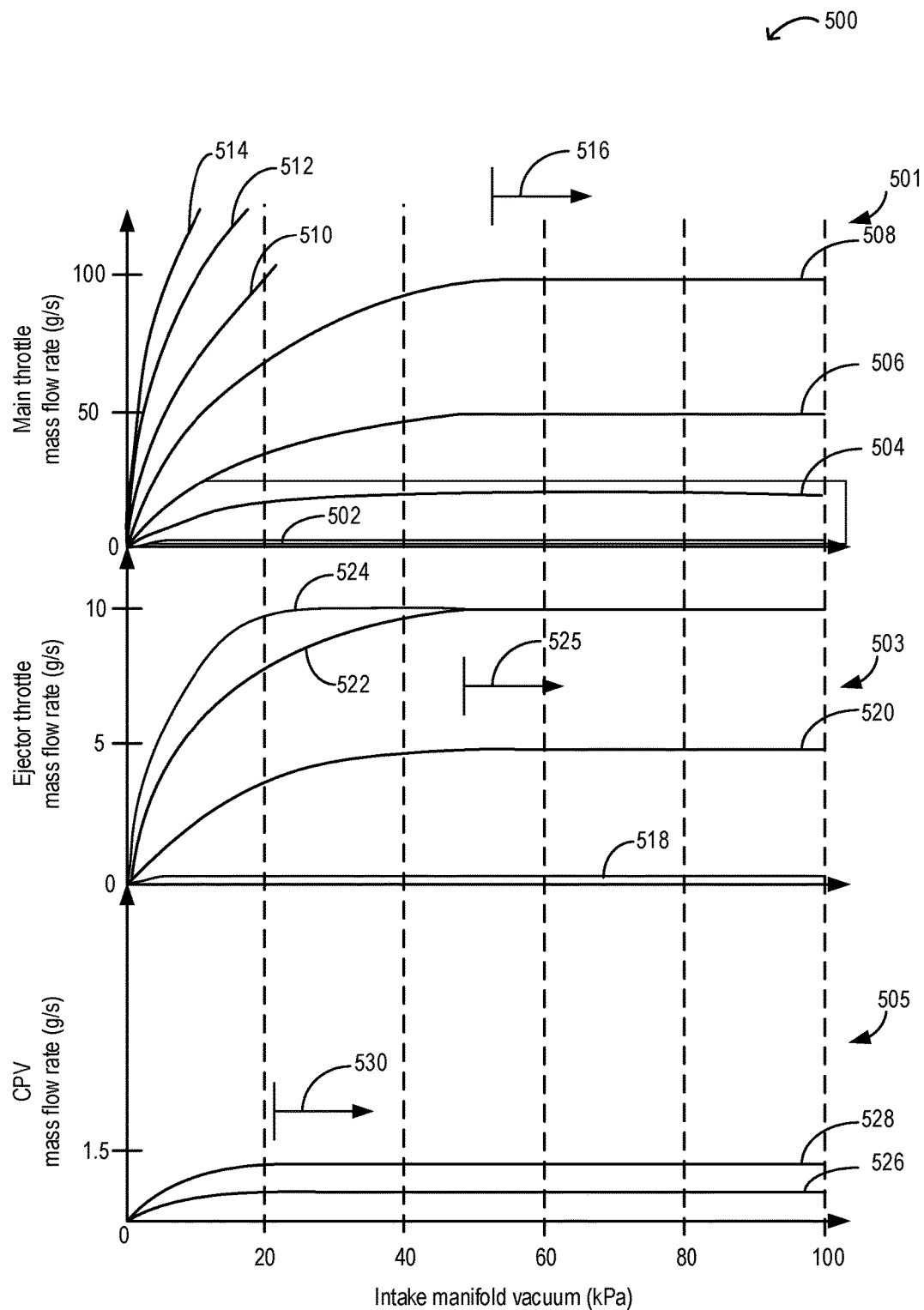
FIG. 5 shows example relationships between a mass flow rate of air through a selected valve, intake manifold vacuum, and valve percentage opening or duty cycle, for each of a canister purge valve, venturi, and main throttle.
Figure 6:
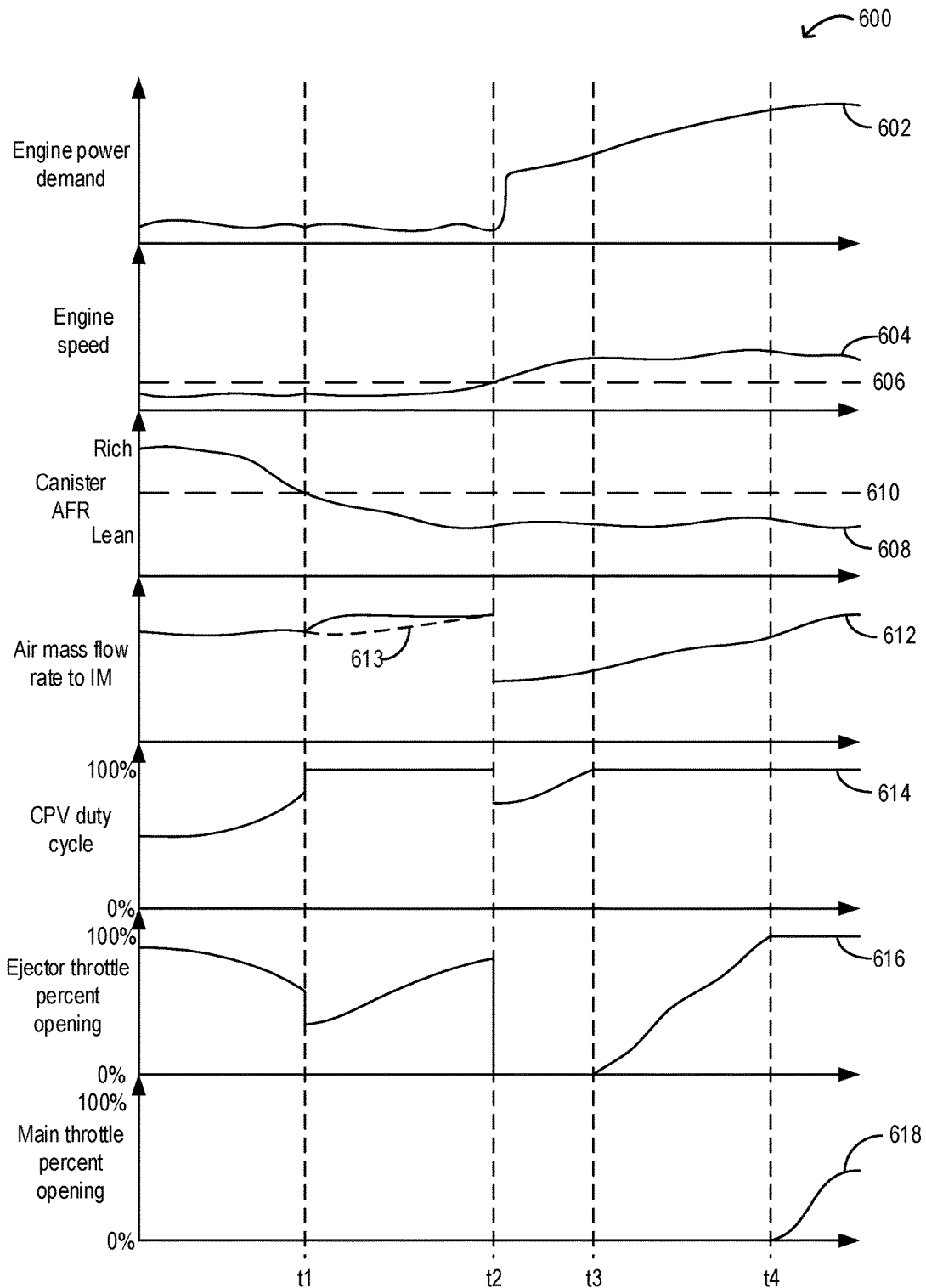
FIG. 6 shows a graphical example of progressive opening of a canister purge valve, venturi throttle, and main throttle based on a desired air mass flow rate to an intake manifold.

The following description relates to systems and methods for controlling purge flow from a fuel vapor canister and airflow to an intake manifold of an engine via coordinated control of a main intake throttle, a canister purge valve, and an auxiliary throttle arranged in series with a venturi and in parallel with the main intake throttle. An example engine system including an intake with a main throttle, an auxiliary throttle arranged in parallel with the main throttle and coupled in series with a venturi (e.g., an ejector), and a fuel vapor recovery system including a canister purge valve is shown in FIG. 1. During engine idle conditions, a desired intake manifold vacuum and corresponding air mass flow rate to the intake manifold may be provided by progressively opening the canister purge valve, the auxiliary throttle, and then the main throttle. For example, as shown by the method presented at FIG. 2, when the fuel vapor canister is lean (e.g., the effluent exiting the canister is leaner than stoichiometry), the CPV may be controlled to obtain the desired air mass flow rate to the intake manifold. Then, if the desired air mass flow rate cannot be obtained by fully opening the CPV, the opening of the auxiliary throttle may be increased. Similarly, if still the desired air mass flow rate cannot be obtained by fully opening each of the CPV and the auxiliary throttle, the main throttle in the engine intake passage may be opened and used to control the air mass flow rate to the engine cylinders to the desired level. In this way, the CPV, auxiliary throttle, and the main throttle may be progressively opened to purge the fuel vapor canister and deliver a desired air mass flow rate to the engine. If the fuel vapor canister is not lean, the CPV may first be controlled based on a fueling demand of the engine, and then, upon reaching a lean state, the progressive openings of the CPV, auxiliary throttle, and main throttle main commence. This progressive opening of valves may also be employed when the engine is not idling, based on engine power demand, as shown by the method presented at FIG. 3. Further still, diagnostics may be performed in order to ensure the proper functioning of the CPV, auxiliary throttle, and main throttle. Then, if there is a fault with one of these valves, or a motor controlling (e.g., actuating) the auxiliary throttle and main throttle loses power, the auxiliary throttle and main throttle may be adjusted into default positions, as shown by the method presented at FIG. 4. Example plots of mass flow rates of each of the CPV, auxiliary throttle (also referred to herein as the venturi or ejector throttle) as a function of intake manifold vacuum and percentage opening or percentage duty cycle of the valve is shown in FIG. 5. Further, FIG. 6 shows example, coordinated adjustments to the CPV, auxiliary throttle, and main throttle based on changing engine operating conditions. By arranging a venturi in series with the auxiliary throttle and staging the openings of the CPV, auxiliary throttle, and main throttle in this way, opportunities for purging and flowing air through the fuel vapor canister may be increased, as well increasing engine control and reducing wear on components of the main throttle.

Turning to the figures, FIG. 1 shows a schematic depiction of a vehicle system 100. The vehicle system 100 includes an engine system 102 coupled to a fuel vapor recovery system (evaporative emissions control system) 154 and a fuel system 106. The engine system 102 may include an engine 112 having a plurality of cylinders 108. The engine 112 includes an engine intake 23 and an engine exhaust 25. The engine intake 23 includes a throttle (referred to herein as the main throttle) 114 fluidly coupled to the engine intake manifold 116 via an intake passage 118.

An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). In some embodiments, there may also be a bypass passage around the compressor which includes a compressor bypass valve (not shown). Controller 166 may actuator the compressor bypass valve to open (and thus recirculate air around the compressor) when the throttle inlet pressure exceeds the compressor pressure and the throttle 114 is closed (e.g., low flow).

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154, described further below, via conduit 134 and a valve (e.g., fuel tank isolation valve, a.k.a., vapor blocking valve) 133, before being purged to the engine intake 23.

Fuel vapor recovery system 154 includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134.

While the depicted example shows a single canister, it will be appreciated that in alternate embodiments, a plurality of such canisters may be connected together. Canister 104 may communicate with the atmosphere through vent 136. In some examples, a canister vent valve 172 may be located along vent 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed. In some examples, an evaporative level check monitor (ELCM) (not shown) may be disposed in vent 136 and may be configured to control venting and/or assist in detection of undesired evaporative emissions. Furthermore, in some examples, one or more oxygen sensors may be positioned in the engine intake manifold 116, or coupled to the canister 104 (e.g., downstream of the canister), to provide an estimate of canister load (e.g., canister air-fuel ratio or an air-fuel ratio of the effluent inside the canister). For example, as shown in FIG. 1, an oxygen sensor 159 is coupled to the canister 104 to provide an estimate of the air-fuel ratio of the effluent in the canister (or purge flow from the canister during a purging operation). In still further examples, one or more temperature sensors 157 may be coupled to and/or within canister 104. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load.

Conduit 134 may include a fuel tank isolation valve 133. Among other functions, fuel tank isolation valve 133 may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 154 may include a multi path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the open/closed duty cycle of a CPV solenoid of the CPV 158. In one example, the duty cycle of the CPV solenoid may be determined by controller 166 responsive to engine operating conditions, including, for example, an air-fuel ratio of the canister effluent and/or a desired intake manifold vacuum or a corresponding desired mass air flow rate into the intake manifold 116 to achieve the desired intake manifold vacuum. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister. Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. However, any gases exiting to the atmosphere via vent 136 may be hydrocarbon-free, having had the hydrocarbons stripped by the canister. In this way, an increased amount of vaporized HCs may be stored in fuel vapor canister 104. During a later engine operation, the stored vapors may be released back into the incoming air charge via fuel vapor purging system 171.

Conduit 150 is coupled to the suction port of an ejector 140 in an ejector system 141 and includes a second check valve (CV2) 170 disposed therein between ejector 140 and CPV 158. In some embodiments, the ejector 140 may be referred to as a venturi. Second check valve (CV2) 170 may prevent intake air from flowing through from the ejector into conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel vapors from canister 104 to intake 23, specifically, intake manifold 116, using vacuum generated in intake manifold 116 during a purge event.

Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

Another conduit 180 couples conduit 150 to a venturi 183 coupled within parallel conduit 182. As depicted in FIG. 1, the venturi 183 is an ejector. Parallel conduit 182 includes an auxiliary throttle 184 disposed therein and arranged in series with the venturi 183. Auxiliary throttle 184 may also be referred to herein as an ejector throttle (or venturi throttle) since it is coupled in series with and in close proximity to the venturi 183. Venturi 183 and auxiliary throttle 184 are arranged in parallel with throttle 114. Specifically, parallel conduit is coupled to and between each of conduit 148 (which couples to intake passage 118 upstream of throttle 114) and conduit 151 (which couples to intake passage 118 (and/or intake manifold 116) downstream of throttle 114). Conduit 180 includes a third check valve (CV3) 181 disposed therein. Third check valve (CV3) 181 may prevent intake air from flowing through from intake passage 118 into conduit 150, while allowing flow of fluid and fuel vapors from conduit 150 into intake manifold 116 via conduit 180 during a canister purging event. CV3 may be a vacuum actuated check valve, for example, that opens responsive to vacuum derived from intake manifold 116. Conduit 180 couples to conduit 150 closer to CV2 170 than where conduit 151 couples to conduit 150.

A conduit 185 is coupled between conduit 180, downstream of third check valve (CV3) 181, and conduit 150, at a location between the fuel vapor canister 104 and CPV 158. An optional, second canister purge valve (CPV2) 186 may be disposed in conduit 185, as shown in FIG. 1. Increasing the duty cycle of CPV2 186 may increase the flow of fuel vapor purge flow (or air flow) from the fuel vapor canister to the intake manifold 116 via conduits 185 and 183.

Returning to ejector system 141, conduit 148 may be coupled to ejector 140 at a first port or inlet 142 (motive flow inlet). Ejector 140 includes a second port 144 (suction flow port) or inlet coupling ejector 140 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a connection or conduit 152. As shown in FIG. 1, in some examples, conduit 152 may couple the third port 146 or outlet of ejector 140 to the intake conduit 118, upstream of compressor 126.

Ejector 140 and/or ejector 183 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

Ejector 140 includes a nozzle 204 comprising an throat 212 which converges in a direction from inlet 142 toward suction inlet 144 so that when air flows through ejector 140 in a direction from port 142 towards port 146, a vacuum is created at port 144 due to the Venturi effect. After the passing through the converging nozzle and throat, the gasses then pass through a diverging section to recover the pressure and make the device efficient, much like a venturi. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158 and throttle 114 may be controlled via controller 166, for example, ejector 140 and ejector 183 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open or maintain open canister vent valve 172. For example, canister vent valve 172 may remain open except during vacuum tests performed on the system (described in further detail below). At the same time, controller 12 may adjust the duty cycle of the CPV solenoid (not shown) and open CPV 158. Pressures within fuel vapor purging system 171 may then draw fresh air through vent 136, fuel vapor canister 104, and CPV 158 such that fuel vapors flow into conduit 150.

The operation of ejector 140 within fuel vapor purging system 171 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116. Further, at least a portion of the fuel vapors may flow from conduit 150 into ejector 140 via port 144. Upon entering the ejector via port 144, the fuel vapors may flow through nozzle 204 toward port 142. Specifically, the throttle inlet pressure (measured at 117) causes the fuel vapors to flow through throat (e.g., orifice) 212. Ejector 140 is powered by the motive flow entering ejector 140 at port 142. This creates a low pressure at the throat 212 and draws air through the fuel vapor canister, which strips fuel vapor as it passes through the canister. After passing through the nozzle, the fuel vapors and air exit ejector 140 at port 146 and flow through conduit 152 to intake passage 118 and then to compressor 126.

Additionally, during engine idle conditions, opening auxiliary throttle 184, positioned in series with ejector 183, may increase the vacuum in conduit 180, thereby increasing the flow of air or purge vapors from fuel vapor canister 104 to intake manifold 116 via conduits 150, 151, 185, and/or 180. Thus, under conditions when increased intake manifold vacuum is desired, the controller 166 may increase the duty cycle of the CPV 158 and/or second CPV 186 and then increase the opening of the auxiliary throttle 184. Specifically, due to the orientation of the orifice in the ejector 183, which converges in a direction from the auxiliary throttle 184 to where the ejector 183 couples to conduit 180, the motive flow of ejector 183 enters at the ejector inlet closest to auxiliary throttle 184 and discharges at the port of ejector 183 that is coupled to intake manifold 116. The suction flow into ejector 183 passes toward ejector 183 from either conduit 180 or conduit 185. The motive flow through the ejector 183 creates a pressure lower than the pressure at intake manifold 116 which tends to provide an enhanced vacuum at conduit 180 and conduit 185. This vacuum may then be used to assist in fuel vapor purging or to increase mass airflow into the intake manifold 116 during certain engine operating conditions, as explained further below, since the venture is fluidly coupled with the CPV 158 and CPV 186.

In one example, ejector 183 may have a relatively large motive flow rate in a range of 3 to 12 g/s, between the inlet of throttle 114 and the intake manifold 116. In steady state conditions, there may be a 7+ kPa pressure drop from the throttle inlet to intake manifold and ejector 183 harnesses that pressure drop to enhance vacuum for fuel vapor purge (or crankcase ventilation). Next, the operation of ejector 140 within fuel vapor purging system 171 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Flow through conduit 148 is always towards port 142 of ejector 140 since throttle inlet pressure of throttle 114 may be the highest pressure point in the system. This flow towards port 142 is known as ejector 140's motive flow rate. When the motive flow is present at a significant level, an enhancing vacuum is formed at CV2 170 in conduit 150.

This fluid may include a mixture of air and fuel, in some examples. After the fluid flows into the ejector via the port 142, it flows through the converging orifice 212 in nozzle 204 in a direction from port 142 towards outlet 146. Because the diameter of the nozzle gradually decreases in a direction of this flow, a low pressure zone is created in a region of orifice 212 adjacent to suction inlet 144. The pressure in this low pressure zone may be lower than a pressure in duct 150.

When present, this pressure differential provides a vacuum to conduit 150 to draw fuel vapor from canister 104. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 (e.g. manifold pressure) in intake conduit 118 downstream of throttle 114, a pressure or air flow sensor 117 (e.g. throttle inlet pressure) in intake conduit 118 between compressor 126 and throttle 114, and a pressure or air flow sensor 119 (e.g. compressor inlet pressure) in intake conduit 118 upstream of compressor 126. In some examples, pressure sensor 119 may comprise a dedicated barometric pressure sensor. Other sensors such as additional pressure, temperature, air/fuel ratio, and composition sensors may be coupled to various locations in the vehicle system 100. As another example, actuators 164 may include fuel injectors 132, throttle 114, auxiliary throttle 184, compressor 126, a fuel pump of pump system 130, CPV 158, CPV 186, etc. The control system 160 may include an electronic controller 166. The controller 166 may receive input data (e.g., signals) from the various sensors of FIG. 1, process the input data, and trigger the actuators of FIG. 1 in response to the processed input data based on instruction or code programmed therein corresponding to one or more routines (e.g., instructions) stored in a memory of the controller 166. For example, adjusting an opening of throttle 114 or auxiliary throttle 184 may include adjusting an actuator of throttle 114 or auxiliary throttle 184 to adjust the position of a throttle plate and thus an amount of airflow through the throttle.

Additionally, vehicle system 100 may include a crankcase ventilation system including a passage 135 for venting fuel vapors from a crankcase of engine 112 to the intake manifold 116 via a valve (e.g., crankcase purge valve) 137.

In some examples, vehicle system 100 may be a hybrid vehicle with multiple sources of torque available to one or more vehicle wheels 55. In other examples, vehicle system 100 is a conventional vehicle with only an engine, or an electric vehicle with only electric machine(s). In the example shown, vehicle system 100 includes engine 112 and an electric machine 52. Electric machine 52 may be a motor or a motor/generator. Crankshaft 53 of engine 112 and electric machine 52 are connected via a transmission 57 to vehicle wheels 55 when one or more clutches 59 are engaged. In the depicted example, a first clutch 59 is provided between crankshaft 53 and electric machine 52, and a second clutch 59 is provided between electric machine 52 and transmission 57. Controller 166 may send a signal to an actuator of each clutch 59 to engage or disengage the clutch, so as to connect or disconnect crankshaft 53 from electric machine 52 and the components connected thereto, and/or connect or disconnect electric machine 52 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
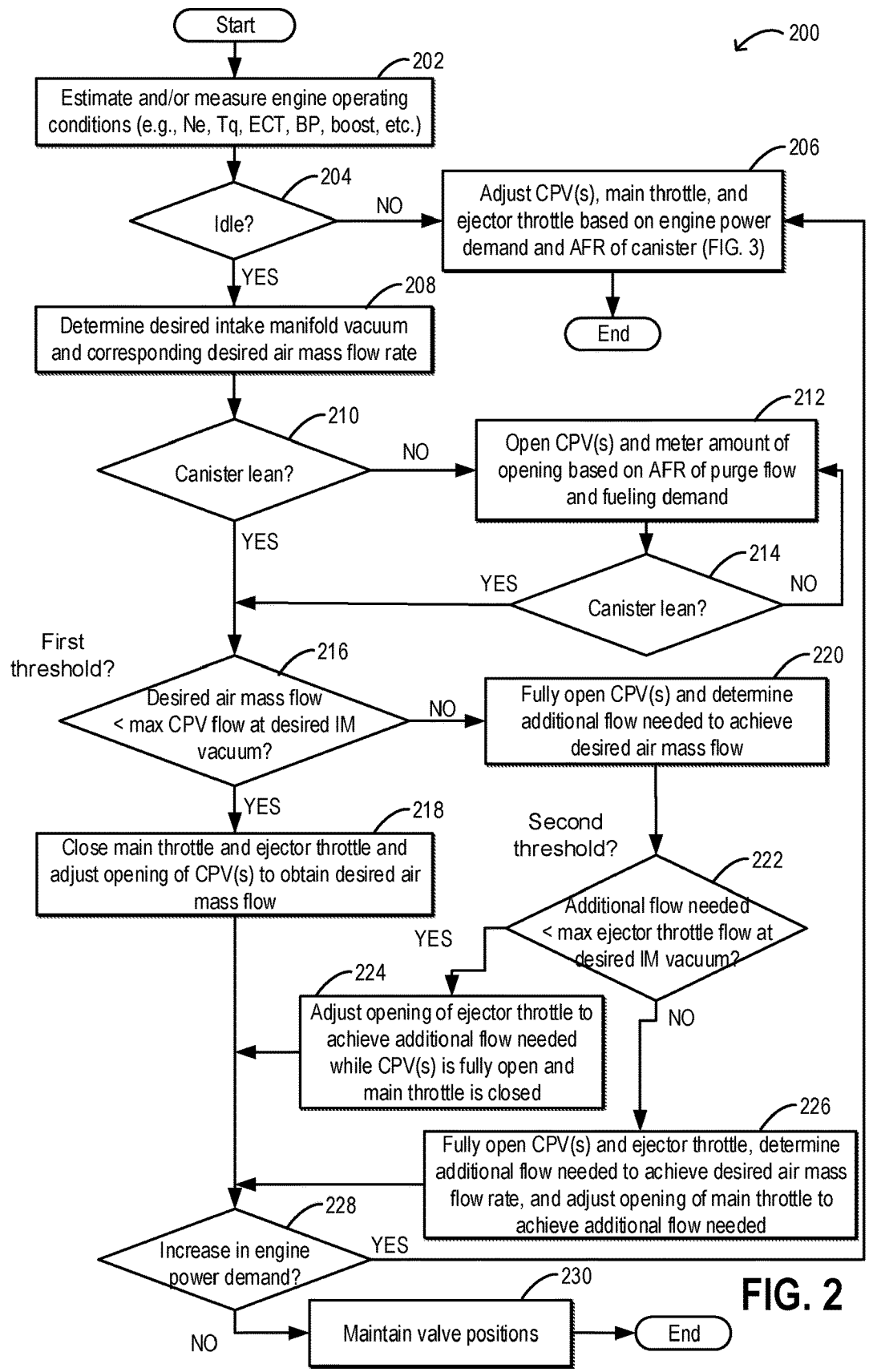
FIG. 2 shows a flow chart of a method for progressively opening a fuel vapor canister purge valve, a venturi throttle, and a main throttle to deliver airflow to an engine intake during engine idle operation.

FIG. 2 shows a flow chart for a method 200 for progressively opening a fuel vapor canister purge valve, a venturi throttle, and a main throttle to deliver airflow to an engine intake during different engine operating conditions. The fuel vapor canister purge valve (CPV) may be one or two valves positioned in a fuel vapor recovery system, such as CPV 158 and/or CPV 186 shown in the fuel vapor recovery system 154 of FIG. 1. The venturi throttle may also be referred to herein as an auxiliary throttle or ejector throttle and may be coupled in series with and directly upstream of a venturi (or ejector), such as auxiliary throttle 184 and venturi 183 shown in FIG. 1. The ejector throttle is arranged in parallel with the main throttle which is positioned in an intake passage, upstream of an intake manifold and engine cylinders of an engine, such as the main throttle 114 shown in FIG. 1. Instructions for carrying out method 200 and the rest of the methods included herein may be executed by a controller (e.g., controller 166 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ actuators of the CPV, ejector throttle, and main throttle (such as one or more motors, valve plates, or additional valve actuators) to adjust the valves into different valve positions (with different amounts of opening) and/or adjust a duty cycle of the valve based on signals received from one or more engine sensors, such as various air temperature and pressure sensors, engine load sensors, an accelerator pedal, throttle positions sensors, etc.

At 202, the method includes estimating and/or measuring engine operating conditions. Engine operating conditions may include engine speed, engine load and/or power demand, engine output torque, operator torque demand (from an accelerator pedal positon sensor, in one example), barometric pressure, intake manifold pressure and/or temperature, boost pressure, an air-fuel ratio of effluent in a fuel vapor canister, air mass flow rates through various engine passages, etc. At 204, the method includes determining whether the engine is idling (e.g., operating in an engine idle condition). The engine may be operating in idle when torque demand and/or engine load is below a threshold load and/or when engine speed is below an engine idle speed (e.g., when the vehicle is stationary). However, during engine idle, fuel may continue to be combusted at engine cylinders. If the engine is not in idle, then the method continues to 206 to adjust one or more CPV(s) of the engine (e.g., CPV 158 and/or CPV 186 shown in FIG. 1), the main throttle (e.g., intake throttle 114 shown in FIG. 1), and the ejector throttle (e.g., auxiliary throttle 184 shown in FIG. 1) based on an engine power demand and an air-fuel ratio (AFR) of effluent in the fuel vapor canister (e.g., canister 104 shown in FIG. 1). In one example, adjusting the CPV(s), main throttle, and auxiliary throttle may include the controller sending an electronic signal to an actuator of one or more of these valves to adjust the duty cycle or amount of opening (e.g., via adjusting a position of a throttle plate of the throttle valves) of the valves according to an estimate of engine power demand and fuel vapor canister AFR. For example, the controller may determine a control signal to send to the actuator of the auxiliary throttle, such as a position of a throttle plate of the auxiliary throttle being determined based on a determination of the engine power demand (which may be based on an accelerator pedal position, or engine torque demand) and AFR of the fuel vapor canister (which may be based on a signal received from an oxygen sensor coupled inside or proximate to the fuel vapor canister). Further details on the method at 206 are described below with reference to FIG. 3.

Alternatively at 204, if the engine is operating in the idle condition, the method continues to 208 to determine the desired intake manifold vacuum and corresponding desired air mass flow rate to the intake manifold during the engine idle condition. In one example, the desired intake manifold vacuum may be a set pressure value for purging the effluent from the fuel vapor canister. In another example, the desired intake manifold vacuum may be determined by the controller as a function of the total volume, current load, and/or air-fuel ratio of the fuel vapor canister, with the desired intake manifold vacuum increasing as the load and volume increase. In another example, the controller determines desired engine torque, then desired cylinder air charge, and then the desired intake manifold pressure (or vacuum) that would result in that cylinder air charge. The controller may then determine the corresponding air mass flow rate to the intake manifold that achieves (e.g., will obtain) the desired intake manifold vacuum. The controller may determine the desired air mass flow rate as a function of the present (e.g., current) engine speed, air temperature (entering the intake manifold), and air pressure (barometric pressure and/or initial pressure of air within the intake manifold). In another example, the controller may determine the desired air mass flow rate based on a calculation using a look-up table stored in memory with the inputs being the desired intake manifold vacuum, engine speed, air temperature, and air pressure and the output being the desired air mass flow rate.

At 210, the method includes determining whether the air-fuel ratio of the contents (e.g., effluent) of the fuel vapor canister (such as fuel vapor canister 104 shown in FIG. 1) is lean. In one example, the effluent of the fuel vapor canister may be lean if the effluent is leaner than stoichiometry. In another example, the effluent of the fuel vapor canister may be determined to be lean when the fuel-air equivalence ratio, $\varphi$, is less than 0.5, where $\varphi=1/\lambda$, with $\lambda$ being defined as the air-fuel equivalence ratio (actual AFR to stoichiometric AFR which is $\lambda=1$). The controller may determine the air-fuel ratio (AFR) of the fuel vapor canister from an output of an oxygen sensor coupled to the canister (such as oxygen sensor 159 shown in FIG. 1) and/or an oxygen sensor positioned downstream of an outlet of the fuel vapor canister. In another embodiment, the controller may determine the air-fuel ratio of effluent inside the fuel vapor canister as a function (e.g., using an equation or relationship or look-up table stored in memory of the controller) of a duration since a last refueling event and a duration since a last purging event of the fuel vapor canister.

If the effluent of the fuel vapor canister is not lean (e.g., has a larger quantity of fuel vapors), then the method proceeds to 212 to open the CPV(s) (e.g., CPV 158 or CPV 158 and CPV 186 shown in FIG. 1) and meter the amount of opening of the CPV(s) based on the AFR of the purge flow from the canister (e.g., the effluent) and a fueling demand at the engine cylinders. For example, the controller may determine a control signal to send to an actuator of the CPV, such as an open/closed duty cycle, that is determined based on a determination of the AFR of the effluent of the canister and the fueling demand (e.g., demanded combustion AFR) at the engine cylinders. For example, the duty cycle of the CPV may have to be controlled so that too much extra fuel (in the form of fuel vapors from the canister) does not enter the engine cylinders. The AFR of the effluent may be based on a measured AFR, as explained above, and the engine fueling demand may be based on operating conditions such as torque demand, a desired combustion AFR, MAF into the intake manifold, and/or MAP. The controller may determine the duty cycle of the CPV through a determination that directly takes into account a determined effluent AFR and fueling demand, such as decreasing the duty cycle with increasing effluent AFR and/or decreasing fueling demand. The controller may alternatively determine the duty cycle based on a calculation using a look-up table with the inputs being fuel vapor canister effluent AFR and fueling demand and the output being CPV duty cycle. As another example, the controller may make a logical determination (e.g., regarding a duty cycle of the CPV) based on logic rules that are a function of fuel vapor canister effluent AFR and engine cylinder fueling demand. The controller may then generate a control signal that is sent to the actuator of the CPV. The controller may additionally or alternatively track the fuel vapor concentration in or around the intake manifold and/or intake passage. Based on this vapor concentration and the air charge, the controller may determine the fuel required at the engine cylinders by the fuel injectors. At 214, the method again includes checking if the effluent of the fuel vapor canister is lean, as described above with reference to 210. If the effluent is not yet lean, the method circles back to 212 to continue adjusting the duty cycle of the CPV(s) based on the AFR of the purge flow and the engine cylinder fueling demand. Alternatively, if the effluent of the fuel vapor canister has turned lean, then the method continues to 216. The method also continues to 216 from 210.

At 216, the method includes determining whether the desired air mass flow to the intake manifold is less than a maximum CPV flow at the desired intake manifold vacuum. The desired air mass flow is the desired air mass flow rate determined at 208, as explained above. The maximum CPV flow may be the maximum possible air mass flow rate through the CPV (e.g., when the duty cycle is actuated to be 100%) at the desired intake manifold vacuum (as determined at 208). The controller may determine the maximum CPV flow at the desired intake manifold vacuum using a relationship (such as one or more curves, graphs, or functions/equations) or one or more look-up tables. An example of a relationship between the air mass flow rate through the CPV (e.g., CPV 158 shown in FIG. 1) as a function of intake manifold vacuum, for different duty cycles of the CPV, is shown at plot 505 in FIG. 5, as described further below. This plot may be stored in graphical, equation, or look-up table form within a memory of the controller and then referenced by the controller during engine operation to determine or look-up the maximum possible flow rate through the CPV (at 100% duty cycle) for the determined desired intake manifold vacuum. If the desired air mass flow rate is less than the maximum possible flow rate through the CPV at the desired intake manifold vacuum, then adjusting the CPV (or CPV(s)) alone may provide the desired air mass flow rate and intake manifold vacuum to the intake manifold. The method then continues to 218 to close (e.g., fully close) the main throttle and the ejector throttle and adjust the amount of opening (such as adjusting the open/closed duty cycle) of the CPV(s) to obtain the desired air mass flow rate to the intake manifold. In one example, this may include fully opening the CPV(s) (e.g., operating the CPV(s) at 100% duty cycle) or operating the CPV(s) at a duty cycle between 100% and 0% (such as 50%). For example, the controller may use the stored relationship between CPV mass flow rate, intake manifold vacuum, and CPV duty cycle (for example, as shown in FIG. 5) to determine the duty cycle to achieve the desired air mass flow rate to the intake manifold. In one embodiment, adjusting the opening of the CPV(s) at 218 may include adjusting only the opening of a main, first CPV, such as CPV 158 shown in FIG. 1, to deliver the desired air mass flow rate to the intake manifold. In another embodiment, adjusting the opening of the CPV(s) at 218 may include adjusting each of the first CPV and a secondary CPV 186 shown in FIG. 1, to deliver the desired air mass flow rate to the intake manifold As one example, when the fuel vapor canister's effluent is rich and the air flow rate (to the engine cylinders) is relatively low, only the CPV 158 may be used to meter air flow from the canister to the intake manifold. However, when either the fuel vapor canister's effluent is rich or the air flow rate to the engine is high, both CPVs 158 and 186 may be opened. If the engine air flow rate is high, both CPV 158 and CPV 186 can be fully open because the amount of fuel vapor they can supply is limited even when the effluent is rich. When the effluent is lean, the air supply requirement at the intake manifold may be fulfilled through either CPV 158 and/or CPV 186 before opening the auxililary throttle and main throttle.

Alternatively at 216, if the desired air mass flow rate is not less than the maximum CPV flow rate at the desired intake manifold vacuum, then the method proceeds to 220 since fully opening the CPV (or operating the CPV(s) at their maximum duty cycles) alone may not provide the desired air mass flow rate to the intake manifold. The method at 220 includes fully opening one or both of the CPV(s) (e.g., 100% duty cycle) and determining the additional flow needed to achieve the desired air mass flow rate to the intake manifold (e.g., the remaining flow needed after fully opening the CPV(s) to reach the desired air mass flow rate). The method proceeds to 222 to determine whether the determined additional flow needed is less than a maximum possible ejector throttle flow at the desired intake manifold vacuum. The maximum ejector throttle flow may be the maximum possible air mass flow rate through the ejector throttle (e.g., when the ejector throttle is actuated to be 100% or fully open) at the desired intake manifold vacuum. The controller may determine the maximum ejector throttle flow at the desired intake manifold vacuum using a relationship (such as one or more curves, graphs, or functions/equations) or one or more look-up tables. An example of a relationship between the air mass flow rate through the ejector throttle (e.g., auxiliary throttle 184 shown in FIG. 1) as a function of intake manifold vacuum, for different percentage openings of the ejector throttle is shown at plot 503 in FIG. 5, as described further below. This plot may be stored in graphical, equation, or look-up table form within the memory of the controller and then referenced by the controller during engine operation to determine or look-up the maximum possible flow rate through the ejector throttle (at 100% open) for the determined desired intake manifold vacuum. If the additional flow needed is less than the maximum possible flow rate through the ejector throttle at the desired intake manifold vacuum, then adjusting the amount of opening of the ejector throttle (in addition to the fully open CPV) may provide the desired air mass flow rate and intake manifold vacuum to the intake manifold. The method then continues to 224 to maintain the main throttle fully closed and CPV(s) fully open and adjust the amount of opening of the ejector throttle (such as adjusting a position of a throttle plate of the ejector throttle to increase the amount of opening through the ejector throttle) to obtain the additional flow needed to achieve to desired air mass flow rate to the intake manifold. In one example, this may include fully opening the ejector throttle (e.g., 100% open) or adjusting the opening of the ejector throttle to be somewhere between 100% and 0% open (such as 60% open). The controller may determine the percentage opening (or amount of opening) of the ejector throttle that achieves the additional flow needed using the stored relationship between the ejector throttle mass flow rate, intake manifold vacuum, and percentage opening of the ejector throttle (for example, as shown at FIG. 5).

Alternatively at 222, if the additional flow needed is not less than the maximum ejector throttle flow at the desired intake manifold vacuum, the method continues to 226. At 226, the method includes maintaining the CPV fully open, fully opening the ejector throttle (e.g., actuating a throttle plate of the ejector throttle to be 100% open), determining the additional flow needed to achieve the desired air mass flow rate to the intake manifold, and then adjusting the amount of opening of the main throttle to achieve the additional flow needed. For example, the additional flow needed to achieve the desired air mass flow rate may be the difference between the desired air mass flow rate and the sum of the maximum flow rates through each of the ejector throttle and CPV(s) at the desired intake manifold vacuum. The controller may determine the amount of opening of the main throttle to achieve the additional flow needed using a relationship (such as one or more curves, graphs, or functions/equations) or one or more look-up tables. An example of a relationship between the air mass flow rate through the main throttle (e.g., main throttle 114 shown in FIG. 1) as a function of intake manifold vacuum, for different percentage openings of the main throttle is shown at plot 501 in FIG. 5, as described further below. This plot may be stored in graphical, equation, or look-up table form within a memory of the controller and then referenced by the controller during engine operation to determine or look-up the percentage opening of the main throttle to achieve the additional flow needed to achieve the desired air mass flow rate at the determined desired intake manifold vacuum.

Each of the methods at 218, 224, and 226 continue on to 228 where the method includes determining whether there is an increase in engine power demand (or demanded torque), which may indicate a request to exit engine idle operation. If there is a request to increase engine power or torque, or to exit engine idle operation, the method continues to 206, as described above. Otherwise, if there is not increase in engine power or torque demand, the method may continue to 230 to maintain the current positions of the valves (CPV(s), ejector throttle, and main throttle) and continue operating in idle. The method then ends.

Figure 3:
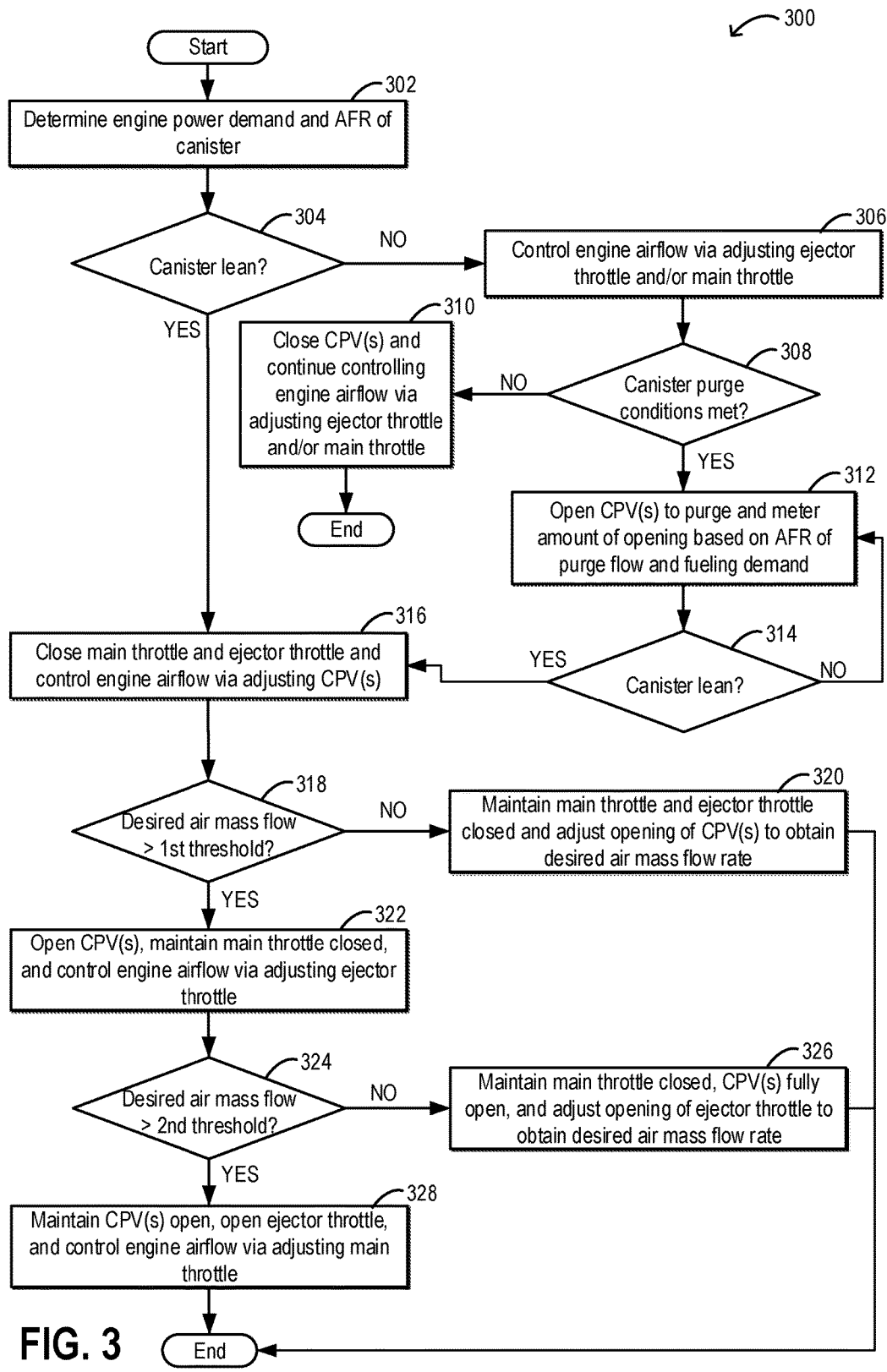
FIG. 3 shows a flow chart of a method for progressively opening a fuel vapor canister purge valve, a venturi throttle, and a main throttle based on engine power demand, when the engine is not idling.

Continuing to FIG. 3, a method 300 is shown for progressively opening the CPV(s), ejector throttle (e.g., venturi or auxiliary throttle), and main throttle based on engine power demand, when the engine is not idling. Method 300 may proceed from 206 of method 200, as explained above. Thus, method 300 may begin after determining that the engine is not idling and/or there is an engine power or torque demand over an idle level. Method 300 begins at 302 by determining the engine power demand and AFR of the fuel vapor canister (e.g., the AFR of the effluent inside the fuel vapor canister). The controller may determine the AFR of the effluent in the fuel vapor canister as described above with reference to 210 of method 200. Additionally, in one example, the controller may determine the engine power demand based on an operator demanded torque (e.g., from a signal from a pedal position sensor of an accelerator pedal). In other examples, the controller may determine the engine power demand based on additional engine operating parameters such as engine speed, engine load, torque demand, and/or boost pressure.

At 304, the method includes determining whether the fuel vapor canister is lean (similarly to as described above for the method at 210 in method 200). If the fuel vapor canister is not lean, then the method continues to 306 to control the engine airflow (e.g., the airflow to the cylinders of the engine) via adjusting the ejector throttle and/or the main throttle. At 308, the method includes determining whether fuel vapor canister purge conditions are met. In one example, fuel vapor canister purge conditions may be met when a load of the fuel vapor canister is greater than a threshold load, where the threshold load may be non-zero, such as 80% or 70% full with fuel vapors. The loading of the fuel vapor canister may be measured or estimated based on one or more of an output of a temperature sensor or oxygen sensor coupled with the fuel vapor canister, a time since a last refueling event, and/or a duration of a last refueling event. In another example, fuel vapor canister purge conditions may be met following a refueling event or if a duration since a last purging event is greater than a threshold amount of time (e.g., 5 hours). If fuel vapor canister purge conditions are not met, the method continues to 310 to maintain the CPV(s) closed (and not purge fuel vapors from the fuel vapor canister) and to continue controlling engine airflow via adjusting a position of the ejector throttle and main throttle (according to an engine power demand and desired air-fuel ratio at the engine cylinders, in one example).

Alternatively, if conditions for purging vapors from the fuel vapor canister are met at 308, the method continues to 312 to open one or more CPV(s) of the system and then meter (e.g., adjust) the amount of opening (e.g., duty cycle) of the CPV(s) based on an AFR of the purge flow (effluent leaving the canister) and fueling demand at engine cylinders of the engine, similarly to as explained above with reference to 212 of method 200. The method then continues to 314 to determine whether the effluent in the fuel vapor canister has become lean (e.g., enough fuel vapors have been purged from the canister so that the gases exiting the canister are now lean, as defined above). If the fuel vapor canister is still not lean, the method circles back to 312. Otherwise, if the fuel vapor canister is lean, the method continues to 316.

If the canister is determined to be lean at 304 or 314, the method continues to 316. At 316, the method includes closing the main throttle and ejector throttle (e.g., fully closing) and then controlling engine airflow to the engine cylinders via adjusting the CPV(s). The method at 316 may include determining the desired intake manifold pressure for the current engine power demand and then determining the corresponding desired air mass flow rate to the intake manifold to deliver the desired intake manifold pressure. Similarly to as described above at 208, the controller may determine the desired air mass flow rate to the intake manifold to deliver the desired intake manifold pressure as a function of the present (e.g., current) engine speed, air temperature (entering the intake manifold), and air pressure (barometric pressure and/or initial pressure of air within the intake manifold). In another example, the controller may determine the desired air mass flow rate based on a calculation using a look-up table stored in memory with the inputs being the desired intake manifold pressure, engine speed, air temperature, and air pressure and the output being the desired air mass flow rate. Then, the controller may use a stored relationship between CPV mass flow rate, intake manifold pressure, and duty cycle of the CPV to determine the duty cycle of the CPV that will deliver the desired air mass flow rate to the intake manifold. The stored relationship may be in equation, graphical, or look-up table form, similar to the relationship shown at plot 505 in FIG. 5 and as described above with reference to 218 of method 200. For example, as the desired air mass flow rate to the intake manifold increases, the controller may actuate the CPV(s) to have a higher open/closed duty cycle.

The method then proceeds to 318 to determine whether the determined desired air mass flow rate to the intake manifold and engine cylinders is greater than a first threshold. In one example, the first threshold may be a maximum possible air mass flow rate of the CPV(s). The controller may determine the maximum possible air mass flow rate through the CPV(s) according to the stored relationship between the between the CPV mass flow rate, intake manifold pressure, and duty cycle of the CPV. For example, for the desired intake manifold pressure and at the maximum duty cycle, the controller may look-up or calculate the maximum possible air mass flow rate through the CPV(s) using the stored relationship (as described above and below with reference to FIGS. 2 and 5). If the desired air mass flow rate is greater than the maximum air mass flow rate through the CPV(s) at the maximum duty cycle (e.g., 100% or fully open) and desired intake manifold pressure, then additional airflow may be needed to reach to desired air mass flow rate. If the desired air mass flow rate is not greater than the first threshold, then the method continues to 320 to maintain the main throttle and ejector throttle closed and adjust the opening of the CPV(s) to obtain the desired air mass flow rate, as described above at 316 and similarly to as described above with reference to 218 of method 200. The method then ends.

Alternatively at 318, if the desired air mass flow rate to the intake manifold is greater than the first threshold, the method continues to 322 to fully open the CPV(s) (one or both of the CPV(s), if there are two CPVs in the fuel vapor purge system), maintain the main throttle closed, and control the engine airflow via adjusting the amount of opening of the ejector throttle. The method then proceeds to 324 to determine whether the determined desired air mass flow to the intake manifold is greater than a second threshold, where the second threshold is greater than the first threshold. In one example, the second threshold may be the sum of the maximum possible air mass flow rate through the CPV(s) and a maximum possible air mass flow rate through the ejector throttle. The controller may determine the maximum possible air mass flow rate through the ejector throttle according to a stored relationship between the between the ejector throttle mass flow rate, intake manifold pressure, and percentage opening of the ejector throttle. The stored relationship may be in equation, graphical, or look-up table form, similar to the relationship shown at plot 503 in FIG. 5 and as described above with reference to 224 of method

200. For example, for the desired intake manifold pressure and at the maximum percentage opening of the ejector throttle, the controller may look-up or calculate the maximum possible air mass flow rate through the ejector throttle using the stored relationship (as described above and below with reference to FIGS. 2 and 5). If the desired air mass flow rate is greater than the maximum air mass flow rate through the CPV(s) and the ejector throttle, then additional airflow may be needed to reach to desired air mass flow rate. If the desired air mass flow rate is not greater than the second threshold, then the method continues to 326 to maintain the main throttle closed, maintain the CPV(s) fully open, and adjust the percentage opening of the ejector throttle to obtain the desired air mass flow rate, using the stored relationship between ejector throttle air mass flow rate, intake manifold pressure, and percentage opening of the ejector throttle, similarly to as described above with reference to 224 of method 200. The method then ends.

Alternatively at 324, if the desired air mass flow rate to the intake manifold is greater than the second threshold, then the method continues to 328 to maintain the CPV(s) fully open, fully open the ejector throttle (e.g., to 100% open), and control the engine airflow to the desired air mass flow rate via adjusting a position (amount of opening) of the main throttle. The controller may determine the percentage opening of the main throttle to deliver the desired air mass flow rate to the intake manifold according to a stored relationship between the between the main throttle mass flow rate, intake manifold pressure, and percentage opening of the main throttle. The stored relationship may be in equation, graphical, or look-up table form, similar to the relationship shown at plot 501 in FIG. 5 and as described above with reference to 226 of method 200. For example, for the desired intake manifold pressure and the remaining air mass flow needed at the intake manifold to achieve the desired air mass flow rate, the controller may look-up or calculate the percentage opening of the main throttle using the stored relationship (as described above and below with reference to FIGS. 2 and 5). The method then ends.

In this way, a method for an engine may include actuating a canister purge valve (CPV) to supply airflow to the engine via a fuel vapor canister while holding closed a main throttle and an auxiliary throttle arranged in parallel with the main throttle and in series with a desired intake venturi; and as a desired intake manifold pressure increases, progressively opening the CPV, then the auxiliary throttle, and then the main throttle to achieve the desired intake manifold pressure. In one example, as shown in FIG. 2, actuating the CPV to supply airflow to the engine via the fuel vapor canister is responsive to an engine idle condition and the desired intake manifold pressure is a desired intake manifold vacuum. The method may further include, in response to an air-fuel ratio of effluent of the fuel vapor canister being rich, adjusting a duty cycle of the CPV based on fueling demand at engine cylinders and, upon the effluent becoming lean, adjusting the duty cycle of the CPV to increase an amount of opening of the CPV and achieve the desired intake manifold pressure. In another example, as shown in FIG. 3, actuating the CPV to supply airflow to the engine via the fuel vapor canister is responsive to an air-fuel ratio of effluent of the fuel vapor canister being lean while an engine power demand of the engine is greater than a threshold and the desired intake manifold pressure is based on the engine power demand. The method may further include determining an air mass flow rate into an intake manifold of the engine to achieve the desired intake manifold pressure based on engine speed, air temperature, and air pressure and progressively opening the CPV, then the auxiliary throttle, and then the main throttle to obtain the determined air mass flow rate. Additionally, in response to the determined air mass flow rate being less than a maximum possible CPV flow rate at the desired intake manifold pressure, the method may include adjusting an open and closed duty cycle of the CPV to obtain the determined air mass flow rate while holding the auxiliary throttle and main throttle closed. Then, in response to the determined air mass flow rate being greater than a maximum possible CPV flow rate at the desired intake manifold pressure, the method may include fully opening the CPV, determining a first additional air mass flow rate needed to achieve the determined air mass flow rate, and adjusting an amount of opening of the auxiliary throttle to achieve the first additional air mass flow rate, while maintaining the main throttle closed. The method may then include, in response to the additional air mass flow rate needed to achieve the determined air mass flow rate being greater than a maximum possible auxiliary throttle flow rate at the desired intake manifold pressure, fully opening the CPV and the auxiliary throttle, determining a second additional flow rate needed to achieve the determined air mass flow rate, and adjusting an amount of opening of the main throttle to achieve the second additional air mass flow rate. In one example, the venturi is an ejector and the auxiliary throttle (also referred to as a venturi throttle or an ejector throttle) is coupled upstream of a motive flow inlet of the ejector and the CPV is coupled upstream of an entraining inlet of the ejector.

Figure 4:
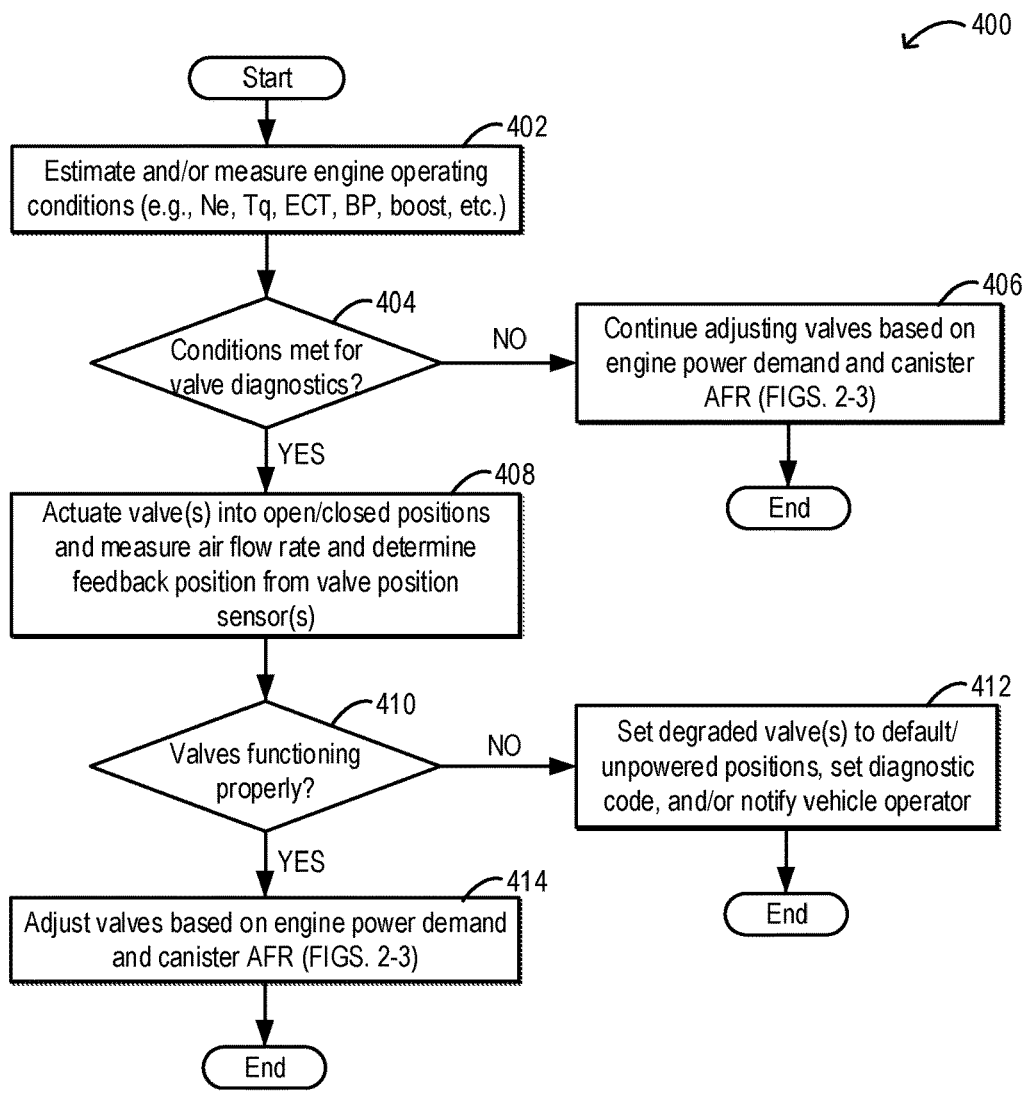
FIG. 4 shows a flow chart of a method for diagnosing functioning of the fuel vapor canister purge valve, venturi throttle, and/or main throttle.

Turning now to FIG. 4, a method 400 is shown for diagnosing functioning of the CPV(s), ejector throttle, and/or main throttle. Method 400 begins at 402 by estimating and/or measuring engine operating conditions. Engine operating conditions may include engine speed, engine load and/or power demand, engine output torque, operator torque demand (from an accelerator pedal positon sensor, in one example), barometric pressure, intake manifold pressure and/or temperature, boost pressure, an air-fuel ratio of effluent in a fuel vapor canister, air mass flow rates through various engine passages, positions of various valves of the engine, etc. At 404, the method includes determining whether conditions are met for valve diagnostics. One or more valves of the engine, including the CPV(s), ejector throttle, and main throttle may be diagnosed for proper functioning and to determine whether they are in commanded positions (and whether feedback systems such as valve position sensors are reading accurately). In one example, conditions for valve diagnostics may be met after a duration of engine operation or number of drive cycles or combustions events, after duration since a last valve diagnostics, and/or responsive to one or more diagnostic flags set at the controller. In another example, conditions for valve diagnostics may include the engine operating in idle (e.g., when the engine speed is at or below an engine idle speed) or when a fuel flow rate of the engine is at a level where the air-fuel ratio is controlled to stoichiometry. If conditions for running one or more valve diagnostics are not met, the method continues to 406 to continue adjusting the engine valves (the CPV(s), ejector throttle, and main throttle) based on engine power demand and canister AFR, as shown at FIGS. 2-3.

If the conditions for performing valve diagnostics of the CPV(s), ejector throttle, and/or main throttle are met at 404, the method continues to 408 to actuate the selected valve(s) into open and closed positions and measure the air flow rate through the selected valve(s) (or in the passages upstream or downstream of the valves) during the actuation and determining the feedback positions from a position sensor coupled to the selected valve(s). The method at 410 includes determining whether the valves are functioning properly (e.g., being actuated into the correct positions as commanded). In one example, the feedback positions may be compared to the measured (or estimated) flow rates and then used by the controller to determine proper functioning of the position sensor and correct positioning of the selected valve(s). If the controller determines the selected valve(s) are not being actuated into the correct (e.g., commanded) position or one or more components of the selected valve(s) (such as the position sensor) are degraded, the method may continue to 412 to set the degraded valve(s) to default or unpowered positions, set one or more diagnostic codes at the controller, and/or notify a vehicle operator that one or more of the valves is degraded and in need of servicing. In one example, the default or unpowered position of the main throttle and ejector throttle may be the main throttle being fully closed and the ejector throttle being fully open. During engine operation, if the motor (e.g., a single motor in one example) controlling both of the main throttle and ejector throttle loses power, the main throttle may be automatically adjusted into the default fully closed position and the ejector throttle may be automatically adjusted into the default fully open position. If instead, at 410, the controller determines the valves are functioning properly and not degraded, the method continues to 414 to adjust the valves based on engine power demand and fuel vapor canister AFR, as shown at FIGS. 2-3. Additionally, while the ejector throttle is open and the main throttle is closed, maximum engine torque can be modulated via a combination of intake valve actuation, spark retard, and injector cut-out.

FIG. 5 shows of graph 500 of example relationships between a mass flow rate of air through a selected valve, intake manifold vacuum, and valve percentage opening or duty cycle, for each of a canister purge valve, ejector throttle, and main throttle. As explained above with reference to FIGS. 2-3, in one example, the relationships shown in FIG. 5 may be stored, in graphical, look-up table, or equation form, in the memory of the controller (e.g., controller 166 shown in FIG. 1) and then referenced during the routines of FIGS. 2-3 to determine a maximum air mass flow rate through the selected valve at a desired intake manifold vacuum (or intake manifold pressure during non-idle conditions) and/or to determine a valve percentage opening or duty cycle of the selected valve at the desired intake manifold vacuum and needed additional air mass flow rate to the intake manifold (to achieve a total desired air mass flow rate at the intake manifold). Though FIG. 5 shows examples of the relationships for intake manifold vacuum, similar relationships between a mass flow rate of air through the selected valve, intake manifold pressure, and valve percentage opening or duty cycle may also be stored in the controller memory and reference during the routine shown in FIG. 3. Additionally, for each plot for each valve, multiple duty cycle or percentage opening curves are shown. While only a selection of these curves are shown in FIG. 5, additional curves at difference percentage opening or duty cycles are possible and may be presented and stored within the controller memory. In one example, the controller may interpolate between adjacent curves to determine values for percentage opening or duty cycle valves not represented by a specific curve. In another example, equation forms of the relationships shown may be stored within the controller memory and may include a term for the specific percentage opening or duty cycle.

Turning first to plot 501 of graph 500, an air mass flow rate through a main throttle (e.g., main throttle 114 shown in FIG. 1) is shown on the y-axis and intake manifold vacuum is shown on the x-axis. Plot 501 shows a plurality of curves, each for a difference percentage opening of the main throttle, and a sonic flow threshold 516. Specifically, curve 502 is for a fully closed (0% open but some leakage) throttle position, curve 504 shows a 10% open throttle position, curve 506 shows a 20% open throttle position, curve 508 shows a 40% open throttle position, curve 510 shows a 60% open throttle position, curve 512 shows an 80% open throttle position, and curve 514 shows a 100% open throttle position (e.g., fully open). At the sonic flow threshold 516, the curves 508, 506, and 504 flatten out and remain at a relatively constant air mass flow rates, even as intake manifold vacuum increases further.

Turning to plot 503 of graph 500, an air mass flow rate through an ejector throttle (e.g., auxiliary throttle 184 shown in FIG. 1) is shown on the y-axis and intake manifold vacuum is shown on the x-axis. Plot 503 shows a plurality of curves, each for a difference percentage opening of the ejector throttle, and a sonic flow threshold 525. Specifically, curve 518 is for a fully closed (0% open but some leakage) throttle position, curve 520 shows a 20% open throttle position, curve 522 shows a 40% open throttle position, and curve 524 shows a 100% open throttle position (e.g., fully open). At the sonic flow threshold 525, the curves flatten out and remain at a relatively constant air mass flow rates, even as intake manifold vacuum increases further. As seen in plot 503, since the ejector throttle includes a throttle in series with an ejector (or venturi), below the sonic flow threshold 525 the curves look more like a traditional throttle and above the sonic flow threshold 525 the curves look more like an ejector/venturi.

Turning to plot 505 of graph 500, an air mass flow rate through a canister purge valve (e.g., CPV 158 or CPV 186 shown in FIG. 1) is shown on the y-axis and intake manifold vacuum is shown on the x-axis. Plot 505 shows a plurality of curves, each for a difference percentage open/closed duty cycles of the CPV, and a sonic flow threshold 530. Specifically, curve 526 is for a 50% duty cycle and curve 528 shows a 100% duty cycle (e.g., fully open). The curves shown in plot 505 may be different than for a traditional CPV that is only coupled to the intake manifold. Specifically, the curves shown in plot 505 are different since they represent flow through a CPV that is fluidly coupled to a venturi/ejector (as shown in FIG. 1, in one example) and thus this CPV is exposed to the ejector's suction and not the intake manifold.

As an example, looking at plot 503 for the ejector throttle, the controller may look-up a maximum flow rate through the ejector throttle for a desired intake manifold vacuum using plot 503. For example, if the desired intake manifold vacuum is 40 kPa, the maximum flow through the ejector throttle is 10 g/s (see curve 524 at 40 kPa). As another example, if the desired intake manifold vacuum is 20 kPa and the additional flow needed to the intake manifold is 7.5 g/s, the controller may determine from plot 503 that the percentage opening of the ejector throttle should be approximately 40% open (curve 522).

FIG. 6 shows an example graph 600 of progressive opening of a canister purge valve, ejector throttle, and main throttle based on a desired air mass flow rate to an intake manifold. Specifically, graph 600 shows changes in engine power demand at plot 602, changes in engine speed at plot 604 relative to an engine idle speed 606, changes in fuel vapor canister effluent air-fuel ratio (AFR) at plot 608 relative to a stoichiometric air-fuel ratio 610, changes in desired air mass flow rate to the intake manifold at plot 612, changes in actual air mass flow rate delivered to the intake manifold at plot 613, changes in a duty cycle of a CPV (e.g., CPV 158 and/or CPV 186, shown in FIG. 1) at plot 614, changes in a percentage opening of an ejector throttle (e.g., auxiliary throttle 184 shown in FIG. 1) at plot 616, and changes in a percentage opening of a main throttle (e.g., main throttle 114 shown in FIG. 1) at plot 618.

Prior to time t1, engine power demand may be relatively low (plot 602) and engine speed is below an engine idle speed 606 (plot 604). Thus, the engine may be operating at idle (e.g., operating in an engine idle condition). The controller may determine a desired intake manifold vacuum while the engine is idling which may allow airflow to be pulled through the fuel vapor canister and delivered to the engine. The controller may then determine a desired air mass flow rate to the intake manifold that will deliver the desired intake manifold vacuum. Since the effluent in the fuel vapor canister is rich (plot 608) prior to time t1, the controller may open the CPV and adjust the amount of opening (e.g., duty cycle) of the CPV based on fueling demand and the canister AFR. For example, because the canister is rich, the CPV may not be actuated to its 100% duty cycle. As the canister AFR decreases, the duty cycle of the CPV increases. The controller may also adjust the ejector throttle (plot 616) while maintaining the main throttle closed (plot 618) to deliver the desired air mass flow rate to the intake manifold during the adjusting the CPV to deliver the desired fueling to the engine cylinders.

At time t1, the canister AFR reaches the stoichiometric air-fuel ratio 610 and then becomes lean. Thus, in response to the canister AFR being lean and the desired air mass flow rate to the intake manifold being greater than the maximum CPV flow at the desired intake manifold vacuum, the controller fully opens the CPV. Then, the percentage opening of the ejector throttle is increased to move the actual air mass flow rate to the intake manifold (plot 613) toward the desired air mass flow rate to the intake manifold (plot 612). The desired air mass flow rate to the intake manifold may be obtained by fully opening the CPV and increasing the percentage opening of the ejector throttle to a level that is less than 10% open (plot 616). Thus, the main throttle main remain closed during the engine idle condition. This may reduce jittering of the main throttle, thereby decreasing degradation to a position sensor of the main throttle.

At time t2, there is an increase in engine power demand (plot 602) and the engine stops idling (plot 604). Since the canister AFR is still lean at time t2, the main throttle and ejector throttle may be closed while adjusting the CPV to deliver engine airflow to the intake manifold. At time t3, the CPV may reach its maximum duty cycle, even though the desired air mass flow rate to the intake manifold continues to rise (due to rising engine power demand). Thus, the desired air mass flow rate to the intake manifold may reach a first threshold at time t3 where it can no longer be obtained by opening the CPV alone. As a result, the controller begins increasing the opening of the ejector throttle (plot 616) to obtain the desired air mass flow rate to the intake manifold. However, the main throttle remains closed at this time. Between time t3 and time t4, the percentage opening of the ejector throttle is increased as the desired air mass flow rate to the intake manifold increases, until it reaches its maximal, 100% opening at time t4. In response to the desired air mass flow rate continuing to increase above a second threshold at time t4 where it can no longer be obtained by fully opening the CPV and ejector throttle alone. As a result, the controller begins increasing the percentage opening of the main throttle (plot 618) while the ejector throttle and CPV are held open. The main throttle is used to deliver the engine power demand and desired air mass flow rate to the engine cylinders, only after fully opening the CPV and ejector throttle. Thus, FIG. 5 shows examples of progressively opening, in a staged fashion, the CPV, then the ejector throttle, and then the main throttle in order to obtain a desired air mass flow rate to the intake manifold, which may be based on a desired intake manifold pressure and/or engine power demand (or torque demand).

For example, FIG. 5 shows an example of a method for adjusting an opening of a canister purge valve (CPV) to supply a determined airflow rate to an intake manifold via a fuel vapor canister while holding a main throttle and auxiliary throttle closed, the auxiliary throttle arranged in parallel with the main throttle and in series with a venturi (as show between time t2 and t3); responsive to a maximum flow rate of the CPV being below the determined airflow rate, fully opening the CPV and increasing an opening of the auxiliary throttle to achieve the determined airflow rate (as show between time t1 and time t2 and between time t3 and time t4); and responsive to a combination of the maximum flow rate of the CPV and a maximum flow rate of the auxiliary throttle being below the determined airflow rate, fully opening each of the CPV and the auxiliary throttle and increasing an opening of the main throttle to achieve the determined airflow rate (as shown after time t4). In one example, the adjusting the opening of the CPV to supply the determined airflow rate to the intake manifold is responsive to an engine idle condition and an air-fuel ratio of effluent of the fuel vapor canister being leaner than stoichiometry, as shown between time t1 and time t2. In another example, the determined airflow rate to the intake manifold is an airflow rate at which a desired intake manifold vacuum during the engine idle condition is achieved and the determined airflow rate is further determined based on one or more of engine speed, air temperature, and air pressure. The method may further include, in response to the air-fuel ratio of the effluent being richer than stoichiometry, first adjusting the opening of the CPV to purge vapors from the fuel vapor canister to the intake manifold based on a fueling demand at the engine and then, in response to the air-fuel ratio transition from rich to lean, increasing the opening of the CPV and adjusting the amount of opening based on the determined airflow rate (as shown prior to time t1 and between time t1 and time t2).

In this way, an engine system including a main throttle, an auxiliary throttle coupled in series with a venturi and in parallel with the main throttle, and fuel vapor recovery system with a canister purge valve (CPV) fluidly coupled to the venturi may be controlled to deliver demanded airflow and/or intake manifold vacuum to an intake manifold, upstream of engine cylinders. Specifically, when effluent of a fuel vapor canister of the fuel vapor recovery system is determined to be lean, the CPV, auxiliary throttle, and main throttle may be progressively open, in a staged fashion, in order to deliver a desired air mass flow rate to the intake manifold that delivers a desired intake manifold vacuum (during idle) or intake manifold pressure (during non-idle conditions). For example, a controller may first open the CPV, while holding the main throttle and auxiliary throttle closed, and then only open the ejector throttle when the desired air mass flow rate to the intake manifold cannot be obtained via the CPV alone. The ejector throttle may then be used to deliver the desired air mass flow rate while the CPV is fully open and the main throttle is fully closed. Then, when the desired air mass flow rate cannot be obtained with the additional opening of the ejector throttle, after fully opening the CPV and the ejector throttle, the controller may open the main throttle and adjust the amount of opening to deliver the desired air mass flow rate to the intake manifold. The technical effect of actuating the CPV to supply airflow to the engine via a fuel vapor canister while holding closed a main throttle and an auxiliary throttle arranged in parallel with the main throttle and in series with a venturi; and as a desired intake manifold pressure increases, progressively opening the CPV, then the auxiliary throttle, and then the main throttle to achieve the desired intake manifold pressure is decreasing jittering of the main throttle, thereby reducing wear on a throttle positon sensor and/or motor of the main throttle, and increasing the frequency and amount of air being drawn through the fuel vapor canister, thereby purging the fuel vapor canister more frequently and maintaining the effluent in the canister at a leaner state. Further, by arranging a venturi in series with the auxiliary throttle and then opening the auxiliary throttle, intake manifold vacuum may be increased, thereby allowing air to be continued to be drawn through the canister (whereas without this auxiliary throttle there may not be enough vacuum to continue drawing air through the canister).

As one embodiment, a method for an engine includes actuating a canister purge valve (CPV) to supply airflow to the engine via a fuel vapor canister while holding closed a main throttle and an auxiliary throttle arranged in parallel with the main throttle and in series with a venturi; and as a desired intake manifold pressure increases, progressively opening the CPV, then the auxiliary throttle, and then the main throttle to achieve the desired intake manifold pressure. In a first example of the method, actuating the CPV to supply airflow to the engine via the fuel vapor canister is responsive to an engine idle condition and wherein the desired intake manifold pressure is a desired intake manifold vacuum. A second example of the method optionally includes the first example and further includes, in response to an air-fuel ratio of effluent of the fuel vapor canister being rich, adjusting a duty cycle of the CPV based on fueling demand at engine cylinders and, upon the effluent becoming lean, adjusting the duty cycle of the CPV to increase an amount of opening of the CPV and achieve the desired intake manifold pressure. A third example of the method optionally includes one or more of the first and second examples, and further includes, wherein actuating the CPV to supply airflow to the engine via the fuel vapor canister is responsive to an air-fuel ratio of effluent of the fuel vapor canister being lean while an engine power demand of the engine is greater than a threshold and wherein the desired intake manifold pressure is based on the engine power demand. A fourth example of the method optionally includes one or more of the first through third examples, and further includes, determining an air mass flow rate into an intake manifold of the engine to achieve the desired intake manifold pressure based on engine speed, air temperature, and air pressure and progressively opening the CPV, then the auxiliary throttle, and then the main throttle to obtain the determined air mass flow rate. A fifth example of the method optionally includes one or more of the first through fourth examples, and further includes, in response to the determined air mass flow rate being less than a maximum possible CPV flow rate at the desired intake manifold pressure, adjusting an open and closed duty cycle of the CPV to obtain the determined air mass flow rate while holding the auxiliary throttle and main throttle closed. A sixth example of the method optionally includes one or more of the first through fifth examples, and further includes, in response to the determined air mass flow rate being greater than a maximum possible CPV flow rate at the desired intake manifold pressure, fully opening the CPV, determining a first additional air mass flow rate needed to achieve the determined air mass flow rate, and adjusting an amount of opening of the auxiliary throttle to achieve the first additional air mass flow rate, while maintaining the main throttle closed. A seventh example of the method optionally includes one or more of the first through sixth examples, and further includes, in response to the additional air mass flow rate needed to achieve the determined air mass flow rate being greater than a maximum possible auxiliary throttle flow rate at the desired intake manifold pressure, fully opening the CPV and the auxiliary throttle, determining a second additional flow rate needed to achieve the determined air mass flow rate, and adjusting an amount of opening of the main throttle to achieve the second additional air mass flow rate. An eighth example of the method optionally includes one or more of the first through seventh examples, and further includes, wherein the venturi is an ejector, wherein the auxiliary throttle is coupled upstream of a motive flow inlet of the ejector and the CPV is coupled upstream of an entraining inlet of the ejector, and wherein progressively opening the CPV, then the auxiliary throttle, and then the main throttle includes not opening the auxiliary throttle until the CPV is fully opening and not opening the main throttle until both the CPV and the auxiliary throttle are fully open.

As another embodiment, a method for an engine includes adjusting an opening of a canister purge valve (CPV) to supply a determined airflow rate to an intake manifold via a fuel vapor canister while holding a main throttle and auxiliary throttle closed, the auxiliary throttle arranged in parallel with the main throttle and in series with a venturi; responsive to a maximum flow rate of the CPV being below the determined airflow rate, fully opening the CPV and increasing an opening of the auxiliary throttle to achieve the determined airflow rate; and responsive to a combination of the maximum flow rate of the CPV and a maximum flow rate of the auxiliary throttle being below the determined airflow rate, fully opening each of the CPV and the auxiliary throttle and increasing an opening of the main throttle to achieve the determined airflow rate. In a first example of the method, the adjusting the opening of the CPV to supply the determined airflow rate to the intake manifold is responsive to an engine idle condition and an air-fuel ratio of effluent of the fuel vapor canister being leaner than stoichiometry. A second example of the method optionally includes the first example and further includes, wherein the determined airflow rate to the intake manifold is an airflow rate at which a desired intake manifold vacuum during the engine idle condition is achieved and wherein the determined airflow rate is further determined based on one or more of engine speed, air temperature, and air pressure. A third example of the method optionally includes one or more of the first and second examples, and further includes, in response to the air-fuel ratio of the effluent being richer than stoichiometry, first adjusting the opening of the CPV to purge vapors from the fuel vapor canister to the intake manifold based on a fueling demand at the engine and then, in response to the air-fuel ratio transitioning from rich to lean, increasing the opening of the CPV and adjusting the amount of opening based on the determined airflow rate. A fourth example of the method optionally includes one or more of the first through third examples, and further includes, wherein the venturi is an ejector including a motive flow inlet, an outlet, and entraining inlet and wherein the auxiliary throttle is coupled upstream of the motive flow inlet, the CPV is coupled upstream of the entraining inlet, and the outlet is fluidly coupled to the intake manifold, downstream of the main throttle.

A system for an engine includes a main throttle disposed in an intake passage of the engine, upstream from an intake manifold; an auxiliary throttle arranged in parallel with the main throttle and in series with a venturi positioned downstream from the auxiliary throttle in a first passage arranged parallel with the intake passage; an evaporative emissions system including: a fuel vapor canister coupled to a fuel tank; and a first canister purge valve (CPV) disposed in a second passage fluidly coupled to each of the fuel vapor canister, the venturi, and the intake passage, downstream of the main throttle; and a controller with computer readable instructions stored in memory for: during engine idle operation and in response to an air-fuel ratio of effluent in the fuel vapor canister being lean, closing the main throttle and auxiliary throttle and determining a desired intake manifold vacuum and corresponding desired air mass flow rate into the intake manifold; increasing an amount of opening of the first CPV while the main throttle and auxiliary throttle remain closed responsive to the desired air mass flow rate being less than a first threshold flow rate; fully opening the first CPV and increasing an amount of opening of the auxiliary throttle while the main throttle remains closed responsive to the desired air mass flow rate being less than a second threshold flow rate, the second threshold greater than the first threshold; and fully opening the first CPV and auxiliary throttle, and increasing an amount of opening of the main throttle responsive to the desired air mass flow rate being less than third threshold flow rate, the third threshold greater than the second threshold. In a first example of the system, the computer readable instructions further include instructions for: during the engine idle operation and in response to the air-fuel ratio of effluent in the fuel vapor canister being rich, closing the main throttle and auxiliary throttle and adjusting the amount of opening of the first CPV based on the air-fuel ratio of the effluent and fueling demand at the engine; in response to the air-fuel ratio of the effluent becoming lean, determining the desired intake manifold vacuum and corresponding desired air mass flow rate into the intake manifold and increasing the amount of opening of the first CPV to obtain the desired air mass flow rate while the main throttle and auxiliary throttle remain closed; in response to the desired air mass flow rate being less than the second threshold flow rate, fully opening the first CPV and increasing the amount of opening of the auxiliary throttle while the main throttle remains closed; and in response to the desired air mass flow rate being less than the first threshold flow rate, fully opening the first CPV and the auxiliary throttle, and increasing the amount of opening of the main throttle. A second example of the system optionally includes the first example and further includes, wherein the computer readable instructions further include instructions for: during engine operation not during idle when engine load is over a threshold load and in response to the air-fuel ratio of effluent in the fuel vapor canister being lean, closing the main throttle and auxiliary throttle and controlling engine airflow to a level that is based on a current engine power demand via adjusting an amount of opening of the first CPV; and as the engine power demand increases, progressively opening the auxiliary throttle and then the main throttle to deliver the level of engine airflow based on the current engine power demand. A third example of the system optionally includes one or more of the first and second examples, and further includes a single motor controlling and actuating each of the auxiliary throttle and the main throttle and wherein the computer readable instructions further include instructions for, in response to a diagnostic indicating degraded functioning of one or more of the auxiliary throttle and main throttle, adjusting the main throttle and auxiliary throttle into default, unpowered positions, where the default, unpowered positions include the main throttle being fully closed and the auxiliary throttle being fully open. A fourth example of the system optionally includes one or more of the first through third examples, and further includes a second canister purge valve disposed in a third passage coupled between the second passage, upstream of the first CPV, and a fourth passage, the fourth passage coupled between the second passage and the first venturi. A fifth example of the system optionally includes one or more of the first through fourth examples, and further includes a second venturi coupled in a fifth passage coupled between the intake passage, upstream of a compressor, and the intake passage, downstream of a charge air cooler and upstream of the main throttle, where the second passage is coupled to an entraining inlet of the second venturi.

In another representation, a method for an engine includes: during a first condition when effluent of a fuel vapor canister is lean, adjusting an opening of a canister purge valve (CPV) to supply a determined airflow rate to an intake manifold via the fuel vapor canister while holding a main throttle and auxiliary throttle closed, the auxiliary throttle arranged in parallel with the main throttle and in series with a venturi; after fully opening the CPV, opening the auxiliary throttle to achieve the determined airflow rate while holding the main throttle closed; and after fully opening the auxiliary throttle, opening the main throttle to achieve the determined airflow rate; and during a second condition when the effluent of the fuel vapor canister is rich, first adjusting the opening of the CPV to purge vapors from the fuel vapor canister to the intake manifold based on a fueling demand at the engine and then, in response to the air-fuel ratio transitioning from rich to lean, increasing the opening of the CPV and adjusting the amount of opening based on the determined airflow rate. In one example, the first condition may follow directly after the second condition, in a same drive cycle, when the effluent of the fuel vapor canister transitioned from rich to lean (as shown in the example presented at FIG. 6).

In one example, the method may include determining whether the effluent of the fuel vapor canister is lean, and in response thereto adjusting an opening of a canister purge valve (CPV) to supply a determined airflow rate to an intake manifold via the fuel vapor canister while holding a main throttle and auxiliary throttle closed, the auxiliary throttle arranged in parallel with the main throttle and in series with a venturi; after fully opening the CPV, opening the auxiliary throttle to achieve the determined airflow rate while holding the main throttle closed; and after fully opening the auxiliary throttle, opening the main throttle to achieve the determined airflow rate; and determining whether the effluent in the fuel vapor canister is rich (which may be not lean), and in response thereto first adjusting the opening of the CPV to purge vapors from the fuel vapor canister to the intake manifold based on a fueling demand at the engine and then, in response to the air-fuel ratio transitioning from rich to lean, increasing the opening of the CPV and adjusting the amount of opening based on the determined airflow rate. In some examples, the adjusting the opening of the CPV to purge vapors from the fuel vapor canister to the intake manifold based on a fueling demand at the engine occurs while or during determining if the effluent of the fuel vapor canister is lean or has transitioned from rich to lean. Then, upon determining that the effluent of the fuel vapor canister has switched from lean to rich, the method transitions from adjusting the opening of the CPV based on the fueling demand of the engine to adjusting the opening of the CPV to supply a determined airflow rate to an intake manifold.

In another example, a system for an engine may include a controller having memory with computer readable instructions for: determining whether the effluent of the fuel vapor canister is lean from an output of an oxygen sensor coupled with the fuel vapor canister, and in response thereto adjusting an opening of a canister purge valve (CPV) to supply a determined airflow rate to an intake manifold via the fuel vapor canister while holding a main throttle and auxiliary throttle closed, the auxiliary throttle arranged in parallel with the main throttle and in series with a venturi; after fully opening the CPV, opening the auxiliary throttle to achieve the determined airflow rate while holding the main throttle closed; and after fully opening the auxiliary throttle, opening the main throttle to achieve the determined airflow rate; and determining whether the effluent in the fuel vapor canister is rich from an output of an oxygen sensor coupled with the fuel vapor canister, and in response thereto first adjusting the opening of the CPV to purge vapors from the fuel vapor canister to the intake manifold based on a fueling demand at the engine and then, in response to the air-fuel ratio transitioning from rich to lean, increasing the opening of the CPV and adjusting the amount of opening based on the determined airflow rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   actuating a canister purge valve (CPV) to supply airflow to the engine via a fuel vapor canister while holding closed a main throttle and an auxiliary throttle arranged in parallel with the main throttle and in series with a venturi; and
   as a desired intake manifold pressure increases, progressively opening the CPV, then the auxiliary throttle, and then the main throttle to achieve the desired intake manifold pressure, wherein the venturi is an ejector, wherein the auxiliary throttle is coupled upstream of a motive flow inlet of the elector and the CPV is coupled upstream of an entraining inlet of the elector, and wherein progressively opening the CPV, then the auxiliary throttle, and then the main throttle includes not opening the auxiliary throttle until the CPV is fully open and not opening the main throttle until both the CPV and the auxiliary throttle are fully open.

2. The method of claim 1, wherein the actuating the CPV to supply airflow to the engine via the fuel vapor canister is responsive to an engine idle condition and wherein the desired intake manifold pressure is a desired intake manifold vacuum.

3. The method of claim 2, further comprising, in response to an air-fuel ratio of effluent of the fuel vapor canister being rich, adjusting a duty cycle of the CPV based on fueling demand at engine cylinders and, upon the effluent becoming lean, adjusting the duty cycle of the CPV to increase an amount of opening of the CPV and achieve the desired intake manifold pressure.

4. The method of claim 1, wherein actuating the CPV to supply airflow to the engine via the fuel vapor canister is responsive to an air-fuel ratio of effluent of the fuel vapor canister being lean while an engine power demand of the engine is greater than a threshold and wherein the desired intake manifold pressure is based on the engine power demand.

5. The method of claim 1, further comprising determining an air mass flow rate into an intake manifold of the engine to achieve the desired intake manifold pressure based on engine speed, air temperature, and air pressure and progressively opening the CPV, then the auxiliary throttle, and then the main throttle to obtain the determined air mass flow rate.

6. The method of claim 5, further comprising, in response to the determined air mass flow rate being less than a maximum possible CPV flow rate at the desired intake manifold pressure, adjusting an open and closed duty cycle of the CPV to obtain the determined air mass flow rate while holding the auxiliary throttle and the main throttle closed.

7. The method of claim 5, further comprising, in response to the determined air mass flow rate being greater than a maximum possible CPV flow rate at the desired intake manifold pressure, fully opening the CPV, determining a first additional air mass flow rate needed to achieve the determined air mass flow rate, and adjusting an amount of opening of the auxiliary throttle to achieve the first additional air mass flow rate, while maintaining the main throttle closed.

8. The method of claim 7, further comprising, in response to the additional air mass flow rate needed to achieve the determined air mass flow rate being greater than a maximum possible auxiliary throttle flow rate at the desired intake manifold pressure, fully opening the CPV and the auxiliary throttle, determining a second additional air mass flow rate needed to achieve the determined air mass flow rate, and adjusting an amount of opening of the main throttle to achieve the second additional air mass flow rate.

9. A method for an engine, comprising:
adjusting an opening of a canister purge valve (CPV) to supply a determined airflow rate to an intake manifold via a fuel vapor canister while holding a main throttle and an auxiliary throttle closed, the auxiliary throttle arranged in parallel with the main throttle and in series with a venturi;
responsive to a maximum flow rate of the CPV being below the determined airflow rate, fully opening the CPV and increasing an opening of the auxiliary throttle to achieve the determined airflow rate; and
responsive to a combination of the maximum flow rate of the CPV and a maximum flow rate of the auxiliary throttle being below the determined airflow rate, fully opening each of the CPV and the auxiliary throttle and increasing an opening of the main throttle to achieve the determined airflow rate.

10. The method of claim 9, wherein the adjusting the opening of the CPV to supply the determined airflow rate to the intake manifold is responsive to an engine idle condition and an air-fuel ratio of effluent of the fuel vapor canister being leaner than stoichiometry.

11. The method of claim 10, wherein the determined airflow rate to the intake manifold is an airflow rate at which a desired intake manifold vacuum during the engine idle condition is achieved and wherein the determined airflow rate is further determined based on one or more of engine speed, air temperature, and air pressure.

12. The method of claim 10, further comprising, in response to the air-fuel ratio of the effluent being richer than stoichiometry, first adjusting the opening of the CPV to purge vapors from the fuel vapor canister to the intake manifold based on a fueling demand at the engine and then, in response to the air-fuel ratio transitioning from rich to lean, increasing the opening of the CPV and adjusting the amount of opening based on the determined airflow rate.

13. The method of claim 9, wherein the venturi is an ejector including a motive flow inlet, an outlet, and an entraining inlet and wherein the auxiliary throttle is coupled upstream of the motive flow inlet, the CPV is coupled upstream of the entraining inlet, and the outlet is fluidly coupled to the intake manifold, downstream of the main throttle.

14. A system for an engine, comprising:
a main throttle disposed in an intake passage of the engine, upstream from an intake manifold;
an auxiliary throttle arranged in parallel with the main throttle and in series with a first venturi positioned downstream from the auxiliary throttle in a first passage arranged parallel with the intake passage;
an evaporative emissions system including:
a fuel vapor canister coupled to a fuel tank; and
a first canister purge valve (CPV) disposed in a second passage fluidly coupled to each of the fuel vapor canister, the first venturi, and the intake passage, downstream of the main throttle; and
a controller with computer readable instructions stored in memory for:
during engine idle operation and in response to an air-fuel ratio of effluent in the fuel vapor canister being lean, closing the main throttle and the auxiliary throttle and determining a desired intake manifold vacuum and corresponding desired air mass flow rate into the intake manifold;
increasing an amount of opening of the first CPV while the main throttle and the auxiliary throttle remain closed responsive to the desired air mass flow rate being less than a first threshold flow rate;
fully opening the first CPV and increasing an amount of opening of the auxiliary throttle while the main throttle remains closed responsive to the desired air mass flow rate being less than a second threshold flow rate, the second threshold greater than the first threshold; and
fully opening the first CPV and the auxiliary throttle, and increasing an amount of opening of the main throttle responsive to the desired air mass flow rate being less than a third threshold flow rate, the third threshold greater than the second threshold.

15. The system of claim 14, wherein the computer readable instructions further include instructions for:
during the engine idle operation and in response to the air-fuel ratio of effluent in the fuel vapor canister being rich, closing the main throttle and the auxiliary throttle and adjusting the amount of opening of the first CPV based on the air-fuel ratio of the effluent and fueling demand at the engine;
in response to the air-fuel ratio of the effluent becoming lean, determining the desired intake manifold vacuum and corresponding desired air mass flow rate into the intake manifold and increasing the amount of opening of the first CPV to obtain the desired air mass flow rate while the main throttle and the auxiliary throttle remain closed;
in response to the desired air mass flow rate being less than the second threshold flow rate, fully opening the first CPV and increasing the amount of opening of the auxiliary throttle while the main throttle remains closed; and
in response to the desired air mass flow rate being less than the first threshold flow rate, fully opening the first CPV and the auxiliary throttle, and increasing the amount of opening of the main throttle.

16. The system of claim 14, wherein the computer readable instructions further include instructions for:
during engine operation not during idle when engine load is over a threshold load and in response to the air-fuel ratio of effluent in the fuel vapor canister being lean, closing the main throttle and the auxiliary throttle and controlling engine airflow to a level that is based on a current engine power demand via adjusting an amount of opening of the first CPV; and
as the engine power demand increases, progressively opening the auxiliary throttle and then the main throttle to deliver the level of engine airflow based on the current engine power demand.

17. The system of claim 14, further comprising a single motor controlling and actuating each of the auxiliary throttle and the main throttle and wherein the computer readable instructions further include instructions for, in response to a diagnostic indicating degraded functioning of one or more of the auxiliary throttle and the main throttle, adjusting the main throttle and the auxiliary throttle into default, unpowered positions, where the default, unpowered positions include the main throttle being fully closed and the auxiliary throttle being fully open.

18. The system of claim 14, further comprising a second canister purge valve disposed in a third passage coupled between the second passage, upstream of the first CPV, and a fourth passage, the fourth passage coupled between the second passage and the first venturi.

19. The system of claim 14, further comprising a second venturi coupled in a fifth passage coupled between the intake passage, upstream of a compressor, and the intake passage, downstream of a charge air cooler and upstream of the main throttle, where the second passage is coupled to an entraining inlet of the second venturi.

* * * * *